United States Patent
Vincent

(10) Patent No.: US 6,422,309 B2
(45) Date of Patent: *Jul. 23, 2002

(54) MOTOR VEHICLE HEATING AND/OR AIR CONDITIONING DEVICE, WITH IMPROVED HEAT EXCHANGE MANAGEMENT

(75) Inventor: Philippe Vincent, Epernon (FR)

(73) Assignee: Valeo Climatisation, La Verriere (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/240,382

(22) Filed: Jan. 29, 1999

(30) Foreign Application Priority Data

Jan. 29, 1998 (FR) .............................. 98 01000

(51) Int. Cl.$^7$ ................................. B60H 1/00
(52) U.S. Cl. ................. 165/204; 165/202; 165/42; 237/12.3 B; 237/12.3 R; 454/160; 454/161
(58) Field of Search .............. 165/41, 42, 43, 165/202, 203, 204; 454/75, 156, 160, 161; 237/12.3 R, 12.3 A, 12.3 B

(56) References Cited

U.S. PATENT DOCUMENTS

| | | | |
|---|---|---|---|
| 4,355,753 A | * 10/1982 | Watanabe | 454/161 X |
| 4,412,425 A | * 11/1983 | Fukami et al. | |
| 4,566,531 A | * 1/1986 | Stolz | 165/42 |
| 4,842,047 A | 6/1989 | Sakurada et al. | 165/43 |
| 5,135,046 A | * 8/1992 | Becquerel et al. | 165/42 X |
| 5,199,485 A | * 4/1993 | Ito et al. | 454/160 X |
| 5,299,631 A | * 4/1994 | Dauvergne | 165/204 |
| 5,309,731 A | 5/1994 | Nonoyama et al. | |
| 5,390,728 A | * 2/1995 | Ban | 165/204 |
| 5,483,807 A | * 1/1996 | Abersfelder et al. | 165/43 X |
| 5,699,960 A | 12/1997 | Kato et al. | |
| 5,857,905 A | * 1/1999 | Uemura et al. | 165/42 X |
| 6,092,592 A | * 7/2000 | Toyoshima et al. | 165/204 |
| 6,213,198 B1 | * 4/2001 | Shikata et al. | 165/42 X |

FOREIGN PATENT DOCUMENTS

| | | | | |
|---|---|---|---|---|
| DE | 864666 | * | 12/1952 | 165/43 |
| DE | 1245774 | * | 7/1967 | 165/43 |
| DE | 37 40 132 | | 6/1989 | |
| DE | 40 34 290 A1 | * | 5/1992 | 165/42 |
| DE | 196 51 279 A1 | * | 6/1997 | 165/204 |
| DE | 197 27 088 | | 1/1998 | |
| EP | 0 733 502 | | 9/1996 | |
| EP | 0 799 733 | | 10/1997 | |
| FR | 2400161 | * | 4/1979 | 165/42 |
| JP | 57-130815 | * | 8/1982 | 165/43 |
| JP | 60-1018 | * | 1/1985 | 454/156 |
| JP | 2-34420 | * | 2/1990 | 454/161 |
| JP | 2-92714 | * | 4/1990 | 165/42 |
| SU | 1530495 A1 | * | 12/1989 | 454/161 |

OTHER PUBLICATIONS

French Search Report dated Oct. 14, 1998.

* cited by examiner

*Primary Examiner*—Ljiljana Ciric
(74) *Attorney, Agent, or Firm*—Morgan & Finnegan, LLP

(57) ABSTRACT

A device for heating and/or air conditioning the passenger compartment of a motor vehicle comprising a first fan able to send a first air flow through a first part of a heating radiator and a second fan able to send a second air flow through a second part of this radiator, distribution shutters are provided for distributing the first and second air flows between a deicing outlet, a ventilation outlet and a feet-level outlet. The device can generate two independent air flows and send them to the top part and bottom part of the passenger compartment of the vehicle.

21 Claims, 15 Drawing Sheets

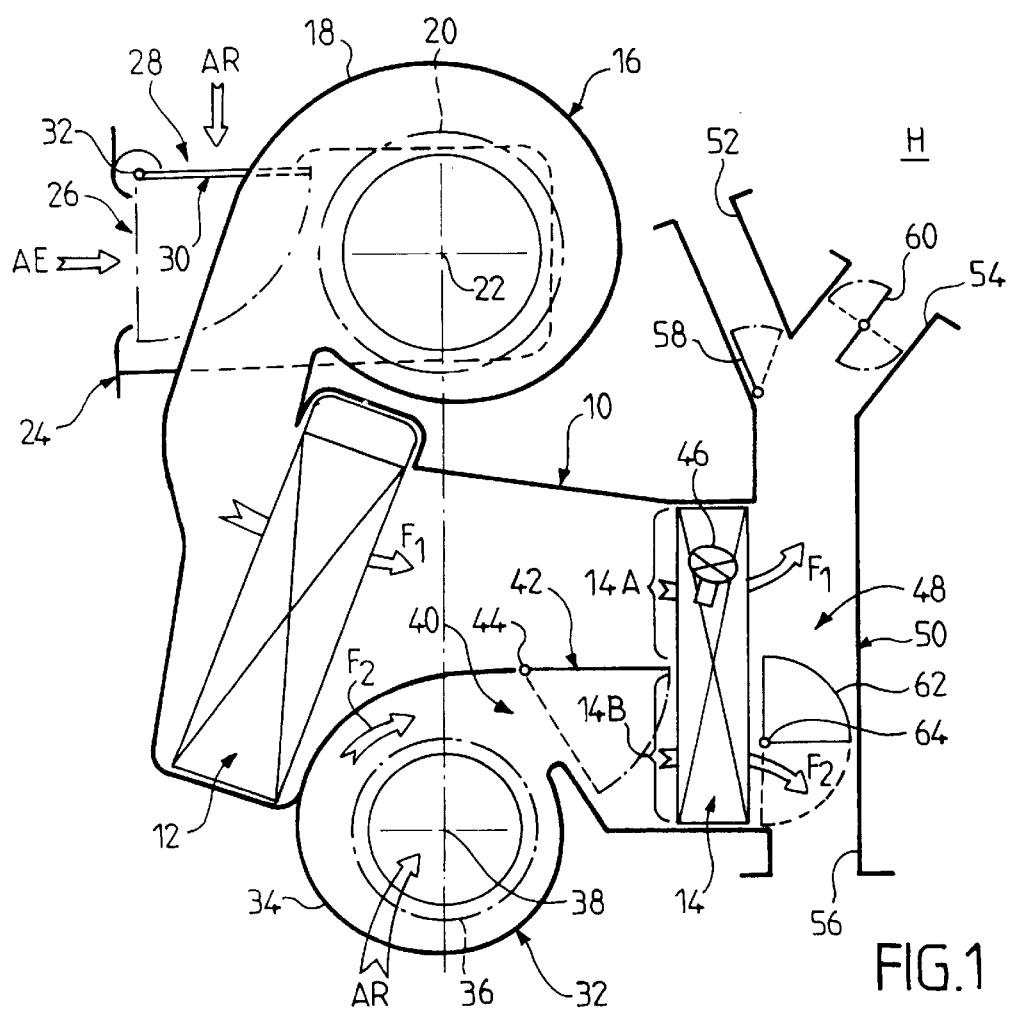
FIG.1
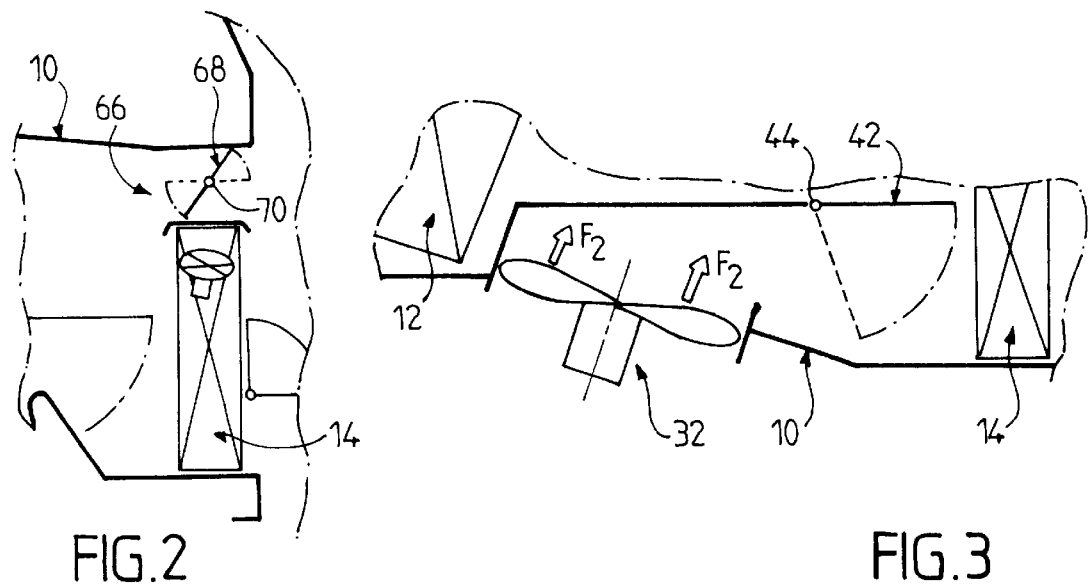
FIG.2
FIG.3

MOTOR VEHICLE HEATING AND/OR AIR CONDITIONING DEVICE, WITH IMPROVED HEAT EXCHANGE MANAGEMENT

FIELD OF THE INVENTION

The invention concerns a device for heating and/or air conditioning the passenger compartment of a motor vehicle, of the type comprising fan means able to send an air flow through a casing housing at least one heat exchanger and communicating with a deicing outlet, a ventilation outlet and a feet-level outlet.

DESCRIPTION OF THE PRIOR ART

Devices of this type are already known in which the casing houses an evaporator and a heating radiator so that an air flow can pass successively through the evaporator and heating radiator in order to be cooled and/or heated therein, according to the thermal air comfort desired by the occupant or occupants of the vehicle.

The air flow thus cooled and/or heated is then set to the different areas of the passenger compartment through the deicing outlet, the ventilation outlet and the feet-level outlet.

From EP-0 733 502, a device of this type is known comprising a double fan fed on the one hand by an external air flow taken outside the passenger compartment and on the other hand a recirculated air flow taken from inside the passenger compartment. This device thus makes it possible to treat the external air flow in order to send it into a region of the passenger compartment, for example at the upper part, and to treat the recirculated air flow in order to send it into a another region of the passenger compartment, for example in the lower part.

However, the performance of such a device is limited because it uses only a single fan and the operating modes are reduced. This is because this known device does not make it possible to effect a separate management between the two regions of the passenger compartment, namely the upper part and the lower part.

U.S. Pat. No. 4,842,047 concerns an air conditioning device which comprises two coaxial fans able to send air flows into two adjacent channels delimited by a separating partition.

This device does not make it possible to vary the proportion between the two air flows and, in addition, the coaxial arrangement of the two blowers limits the possibilities of locating these blowers.

U.S. Pat. No. 5,309,731 concerns a motor vehicle air conditioning device which comprises two air passage conduits each having a fan and a heat exchanger. The fan situated in a first conduit sucks in the recirculated air, heats it and then sends it into the motor vehicle passenger compartment through lower ventilation vents. The fan situated in the second conduit sucks in the external air, heats it and then sends it into the passenger compartment through deicing vents.

This device does not make it possible to vary the proportion of the air flows passing through the heat exchangers and coming from one and/or other of the fans. In addition, the management of the external air source and the management of the recirculated air source are dependent on each other.

SUMMARY OF THE INVENTION

The aim of the invention is notably to overcome the aforementioned drawbacks.

It aims principally to procure a device capable of generating two independent heat exchange flows, one intended for the upper part of the passenger compartment and the other for the lower part of the passenger compartment, in order notably to dispense with problems of misting of the vehicle windows.

To this end it proposes a heating and/or air conditioning device of the type defined in the introduction, in which the fan means comprise a first fan able to send a first air flow through a first part of a heating radiator and a second fan able to send a second air flow through a second part of this radiator, in which a distribution means is provided in the casing, upstream of the radiator with respect to the second air flow, in order to control the first air flow and/or the second air flow through the radiator, and in which distribution means are provided for distributing the first and second air flows, which have passed through the radiator, between the deicing outlet, the ventilation outlet and the feet-level outlet.

Thus the device of the invention comprises two fans able to generate two separate air flows intended to be sent into two parts of the passenger compartment, that is to say generally the upper part and the lower part.

Because of this, it is possible to distribute, to the upper and lower parts of the passenger compartment, two air flows treated independently for temperature.

The distribution means makes it possible to control, proportion and/or layer the first air flow and the second air flow which pass through the radiator. The result is a regulation of the proportion of the first air flow and of the second air flow, without mixing these two air flows. It is possible in some to cause either the first air flow alone or the second air flow alone to pass through the radiator.

In a preferred embodiment of the invention, an evaporator is interposed between the first fan and the radiator, so that the first air flow passes successively through the evaporator and the radiator, whilst the second air flow passes only through the radiator.

Thus the first air flow can be cooled and/or heated, whilst the second air flow can only be heated.

According to another characteristic of the invention, the first fan and the second fan are able to be fed each by an external air flow and/or a recirculated air flow.

Preferably, the first fan is able to be fed by an external air flow and/or a recirculated air flow, whilst the second fan is able to be fed by a recirculated air flow.

According to another characteristic of the invention, the first part of the radiator is at the top part and is situated on the same side as the deicing outlet and the ventilation outlet, whilst the second part of the radiator is at the bottom part and is situated on the same side as the feet-level outlet.

Preferentially, the deicing outlet and the ventilation outlet can be fed by an air flow which has passed through the evaporator (where applicable) and the radiator, whilst the feet-level outlet is fed by an air flow which is passed through the second part of the radiator, without having passed through the evaporator.

In one embodiment of the invention, the first fan and the second fan are both disposed on the same side, or upstream side, of the radiator, whilst the deicing, ventilation and feet-level outlets communicate with an outlet chamber situated on the opposite side, or downstream side, of the radiator, so that the first air flow and the second air flow pass through the radiator in the same direction.

In this embodiment, the outlet chamber advantageously houses a distribution shutter able to adopt at least two different positions: a closed position in which the outlet chamber is divided into a first compartment and a second compartment so that the first air flow is directed towards the deicing outlet and the ventilation outlet whilst the second air flow is directed towards the feet-level outlet; and an open position in which the first compartment and the second compartment communicate so that the first air flow and the second air flow can at least partly mix.

The aforementioned distribution means advantageously comprises a distribution shutter provided at the outlet from the second fan in order to control the second air flow.

This distribution shutter is preferably able to adopt a closed position in which the outlet of the second fan is closed and at least one open position in which the outlet of the second fan is open.

In another embodiment of the invention, the first fan is disposed on one side, or upstream side, of the radiator whilst the second fan is disposed on the other side, or downstream side of the radiator, and the deicing and ventilation outlet communicate with an outlet chamber situated on the downstream side, of the radiator, whilst the feet-level outlet communicates with a lower part of the casing on the upstream side of the radiator, so that the first air flow and second air flow pass through the radiator in opposite directions.

This embodiment makes it possible to dispose the first and second fan respectively upstream and downstream of the radiator.

In this embodiment, a distribution shutter is advantageously provided at the outlet of the second fan in order to control the second air flow and thus prevent mixing between the first air flow and second air flow.

Preferably, this distribution shutter is able to adopt at least two positions: a closed position in which the outlet of the second fan is closed and an open position in which the outlet of the second fan is open.

This distribution shutter is advantageously situated on the upstream side of the radiator.

In the aforementioned embodiment, provision can be made for the first fan and second fan to be situated adjacent to the casing.

Provision can also be made, as a variant, for the first fan to be situated adjacent to the casing whilst the second fan is situated at a distance from the casing, in particular close to the rear seats of the vehicle.

This last solution makes it possible to increase the compactness of the device and also to take off recirculated air at the rear of the passenger compartment.

In the invention, the first fan and second fan can be formed by two independent fans, or by a double fan.

The radiator of the device of the invention can be suitable for having a hot fluid pass through it under the control of a flow-rate adjustment valve, according to the technique known as "adjustment on water".

As a variant, the casing delimits an air heating branch in which the radiator is housed and a cold air transmission branch, and a mixing shutter is provided at the junction of the aforementioned two branches in order to ensure the distribution of the air flow between the two branches and to regulate the temperature of the air flow to be sent to the deicing and ventilation outlets. Thus the temperature is adjusted by means of the technique known as "adjustment on air".

According to another characteristic of the invention, the device comprises an upper air passage provided in the casing close to the first part of the radiator and communicating with an outlet chamber downstream of the radiator, this upper air passage being controlled by a shutter so that a proportion of the first air flow can take the upper air passage without passing through the radiator. The shutter then makes it possible to mix the air in the upper part of the casing.

According to yet another characteristic of the invention, the device comprises a lower air passage provided in the casing close to the second part of the radiator and close to the feet-level outlet and communicating with an outlet chamber downstream of the radiator, this lower air passage being controlled by at least one shutter so that a proportion of the second air flow can take the upper air passage without passing through the radiator. The shutter then makes it possible to mix the air in the lower part of the casing.

In accordance with the invention, it is possible to use either a single radiator, or a radiator formed by the joining of two adjacent radiators able to have respectively the first air flow and the second air flow pass through them.

The invention also makes provision, in a variant, for an additional radiator situated opposite the second part of the radiator and also able to have the second air flow pass through it.

This makes it possible to increase the heating of the second air flow and, consequently, the heating of the lower part of the passenger compartment.

Other characteristics and advantages of the invention will emerge from a reading of the following detailed description, given solely by way of example, and with reference to the accompanying drawings.

BRIEF DESCRIPTION OF THE DRAWINGS

In the drawings:

FIG. 1 is a schematic view in section of a device for heating and/or air conditioning the passenger compartment of a motor vehicle, according to a first embodiment of the invention;

FIG. 2 is a partial view corresponding to FIG. 1 in a variant embodiment;

FIG. 3 is another partial view corresponding to FIG. 1 in another variant embodiment;

Figure 4:
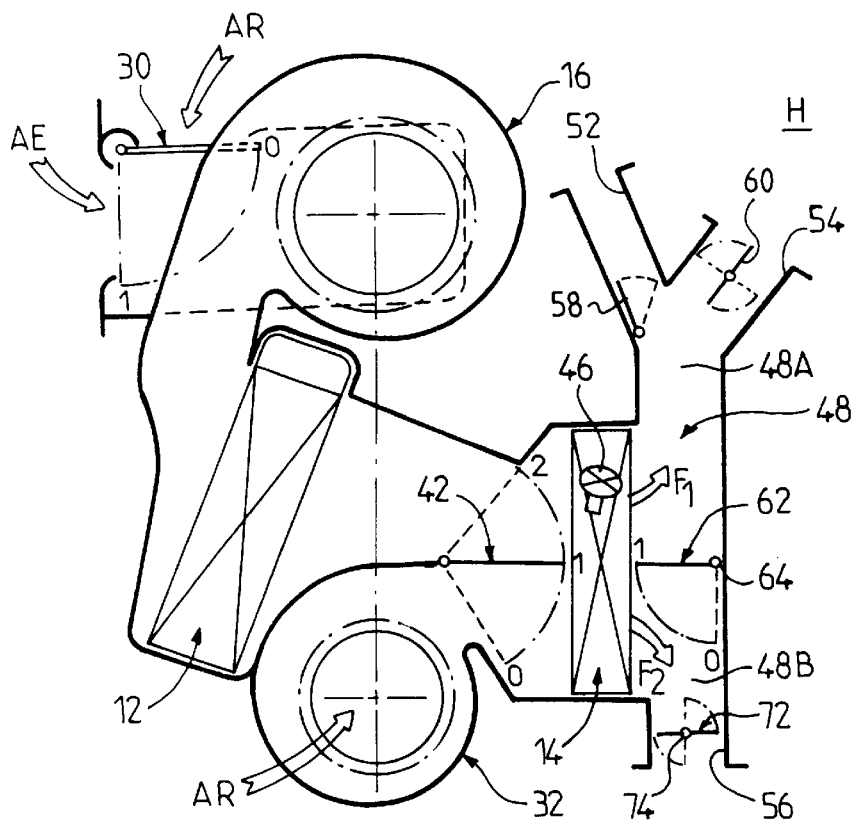
FIG. 4 is a view in section of a device according to a second embodiment of the invention.

In these figures, the common elements are designated by the same references.

DETAILED DESCRIPTION OF THE INVENTION

Reference is made first of all to FIG. 1, which depicts a device for heating and/or air conditioning the passenger compartment H of a motor vehicle, comprising a casing 10 housing an evaporator 12 and a heating radiator 14, respectively on the inlet side and on the outlet side of the casing. The inlet of the casing is connected to a first fan 16 of the radial type having a housing 18 in the form of a shell in which a propeller 20 can rotate about an axis 22.

The fan 16 is connected to a feed casing 24 provided with two inlets 26 and 28 controlled by a shutter 30 of the flag type mounted so as to pivot about a shaft 32. The inlets 26 and 28 are able to be fed respectively with an external air flow AE taken from outside the passenger compartment H, whilst the air inlet 28 is able to be fed by a recirculated air flow AR taken from inside the passenger compartment. Thus, according to the position occupied by the shutter 30, the fan 16 can send either an external air flow AE or a recirculated air flow AR through the evaporator 12. The latter is connected to a conventional air conditioning circuit (not shown).

The device also comprises a second fan 32, also of the radial type, fed here by a recirculated air flow AR. The fan comprises a housing 34 in the form of a shell in which a propeller 36 rotates about an axis 38 parallel to the axis 22. The housing 34 has an outlet 40 which opens out into the casing 10, opposite the radiator 14. The outlet 40 is controlled by a regulating shutter 42 of the flag type, mounted so as to pivot about a shaft 44 and able to move between a closed position (depicted in broken lines) in which the outlet 40 is closed and an open position (depicted in solid lines) in which the outlet 40 is open.

The first fan 16 is able to produce an air flow F1 which passes successively through the evaporator 12 and an upper part or top part 14A of the radiator, whilst the second fan 32 is able to produce a second air flow F2 which passes through a lower part or bottom part 14B of the radiator 14.

Thus the first air flow F1 can be successively cooled and heated, whilst the second air flow F2 can only be heated.

The radiator 14 can have a hot fluid pass through it, normally the vehicle engine cooling liquid. A regulating valve 46 makes it possible to progressively regulate the flow of hot fluid passing through the radiator and consequently the temperature of the air flow F1 or F2 at the outlet from the radiator.

These two flows emerge in an outlet chamber 48 formed outside a distribution casing 50 which is connected, at the top part, to a deicing outlet 52 and to a ventilation outlet 54 and, at the bottom part, to a feet-level outlet 56.

The outlet 52 is able to feed at least one windscreen deicing/demisting vent (not shown), whilst the outlet 54 is able to feed at least one vent (not shown) provided on the vehicle fascia.

The outlet 52 is controlled by a pivoting shutter 58 of the flag type, whilst the outlet 54 is controlled by a pivoting shutter 60 of the butterfly type.

In this embodiment, the fans 16 and 32 are both disposed on the same side, or upstream side, of the radiator 14 and the different outlets 52, 54 and 56 all communicate with the outlet chamber 48, which is situated on the downstream side of the radiator. As a result the air flows F1 and F2 pass through the radiator 14 in the same direction.

The outlet chamber 48 houses a distribution shutter 62, in the example of the drum type, mounted so as to pivot about a shaft 64. This shutter 62 is able to adopt at least two different positions:

a first position (depicted in broken lines) in which the flows F1 and/or F2 are directed towards the deicing outlet 52 and ventilation outlet 54, and a second position (depicted in solid lines) in which the flows F1 and/or F2 are redirected towards the feet-level outlet 56.

In the variant embodiment in FIG. 2, the device also comprises an upper air passage 66 provided in the casing close to the first part 14A of the radiator and communicating with the outlet chamber 58 which is situated downstream of the radiator. This upper air passage 66 is controlled by a shutter 68 of the butterfly type mounted so as to pivot about a shaft 70. When the shutter 68 is at least partly open, a proportion of the flow F1 takes the passage 66 without passing through the radiator 14, which enables the air flow F1 in the outlet chamber 48 to be regulated by mixing, in adjustable proportions, a hot air flow and a fresh air flow. This temperature regulation is thus effected by the technique known as "regulation on air".

The device according to the variant in FIG. 3 differs from that of FIG. 1 by the fact that the fan 32 is here an axial fan, so that the flow F2 is sent parallel to the axis of the propeller and not tangentially as in the case of a radial fan. The fan 32 therefore does not have a housing of the shell type.

The device depicted in FIG. 4 is similar to that of FIG. 1. However, the shutter 22 can here adopt three different positions:

position 0, in which the outlet 40 of the fan 32 is closed;

position 1, in which the outlet 40 is open and the shutter 42 enables the flows F1 and F2 to be partitioned so that they pass respectively through the parts 14A and 14B of the radiator; and position 2, in which the shutter 42 is completely open and enables the flow F2 to pass through the parts 14A and 14B of the radiator (in this position the flow F1 cannot gain access to the radiator 14).

In addition the shutter 62 here consists of a pivoting shutter of the flag type which can adopt two positions:

position 0, in which the outlet chamber 48 feeds the outlets 52, 54 and 56; and position 1, in which the outlet chamber 48 is divided into a first compartment (the top compartment) 48A communicating with the outlets 52 and 54 and a second compartment (the bottom compartment) 54B communicating with the outlet 54. In addition, this outlet can itself be controlled by a shutter 72 of the butterfly type mounted so as to pivot about a shaft 74.

In FIG. 4, the shutter 30 can adopt two positions:

position 0, or "external air position"; and position 1, or "recirculated air position".

Table 1 below gives, by way of example, different possible distribution modes according to the respective positions of the shutters 42, 62 and 30 and according to the operating mode of the fans 16 and 32. For the latter, the figures 0 and 1 correspond respectively to an off mode and an on mode.

TABLE 1

| Distribution modes | Shutter 42 | Shutter 62 | Shutter 30 | Fan 16 | Fan 32 |
|---|---|---|---|---|---|
| Deicing | 0 | 0 | 0 | 1 | 0 |
| Deicing + Heating | 1 | 1 | 0 | 1 | 1 |
| Heating | 2 | 0 | 0 or 1 | 0 | 1 |
| Heating + Ventilation | 1 | 1 | 0 | 1 | 1 |
| Ventilation | 0 | 0 | 0 or 1 | 1 | 0 |

Figure 5:
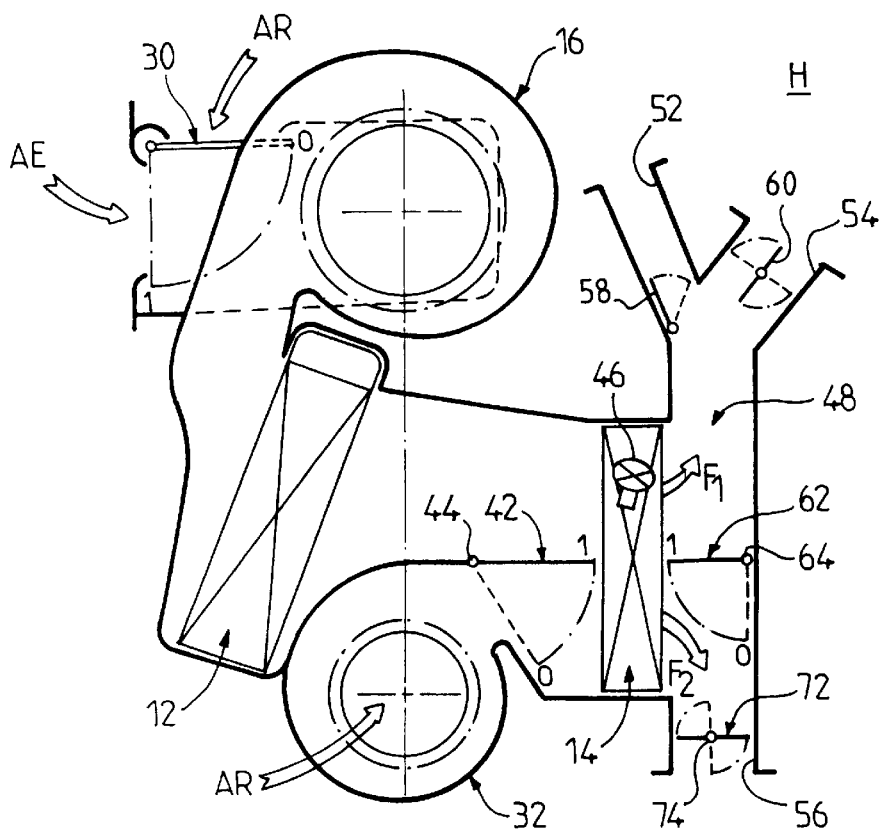
FIG. 5 is a view in section of a device according to a third embodiment of the invention.

The device depicted in FIG. 5 is similar to that in FIGS. 1 and 4. In this embodiment, the shutter 42 can adopt two positions 0 and 1 as in the case of FIG. 1. It cannot adopt position 2 of full opening as in the case of FIG. 4. The shutter 62 is also a shutter of the flag type similar to that of FIG. 4 and able to adopt two different positions: 0 and 1.

Table 2 below gives, by way of example, different distribution modes according to the position of the shutters 42, 62 and 30 and the fans 16 and 32.

TABLE 2

| Distribution modes | Shutter 42 | Shutter 62 | Shutter 30 | Fan 16 | Fan 32 |
|---|---|---|---|---|---|
| Deicing | 0 | 0 | 0 | 1 | 0 |
| Deicing + Heating | 1 | 1 | 0 | 1 | 1 |
| Heating | 0 | 0 | 0 or 1 | 1 | 0 |
| Heating + Ventilation | 1 | 1 | 0 | 1 | 1 |
| Ventilation | 0 | 0 | 0 or 1 | 1 | 0 |

Figure 6:
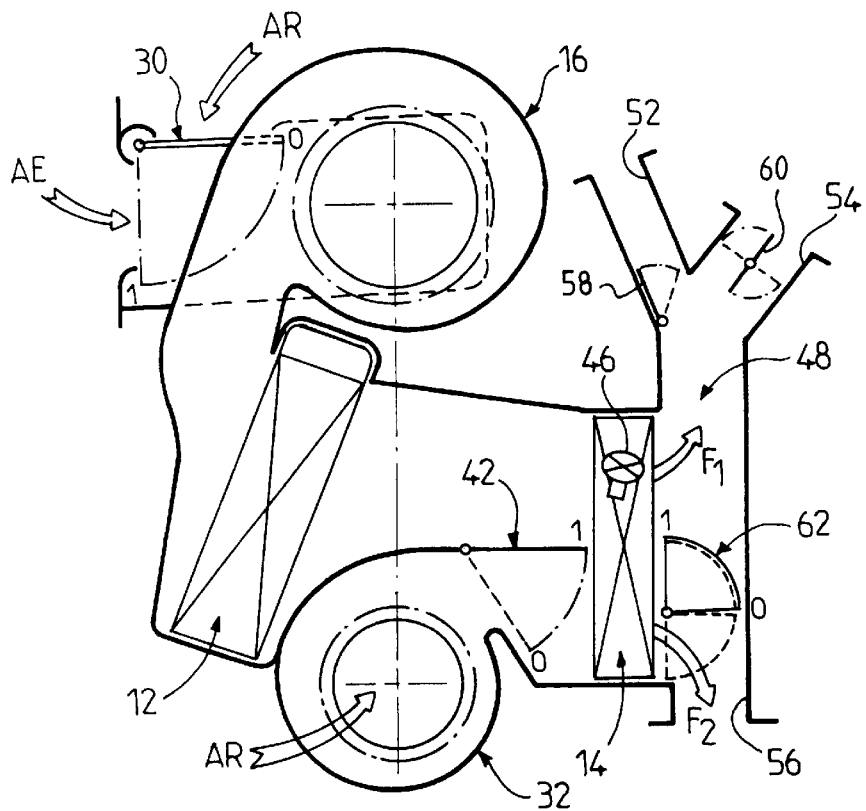
FIG. 6 is a view in section of a device according to a fourth embodiment of the invention.

The device depicted in FIG. 6 is similar to that of FIG. 1. The respective positions of the shutters 42, 62 and 30 are designated by the figures 0 and 1.

Table 3 below gives, by way of example, different distribution modes according to the respective positions of the shutters and the operating modes of the two fans.

TABLE 3

| Distribution modes | Shutter 42 | Shutter 62 | Shutter 30 | Fan 16 | Fan 32 |
|---|---|---|---|---|---|
| Deicing | 0 | 0 | 0 | 1 | 0 |
| Deicing + Heating | 1 | 1 | 0 | 1 | 1 |
| Heating | 0 | 1 | 0 or 1 | 0 | 1 |
| Heating + Ventilation | 1 | 1 | 0 | 1 | 1 |
| Ventilation | 0 | 0 | 0 or 1 | 1 | 0 |

Figure 7:
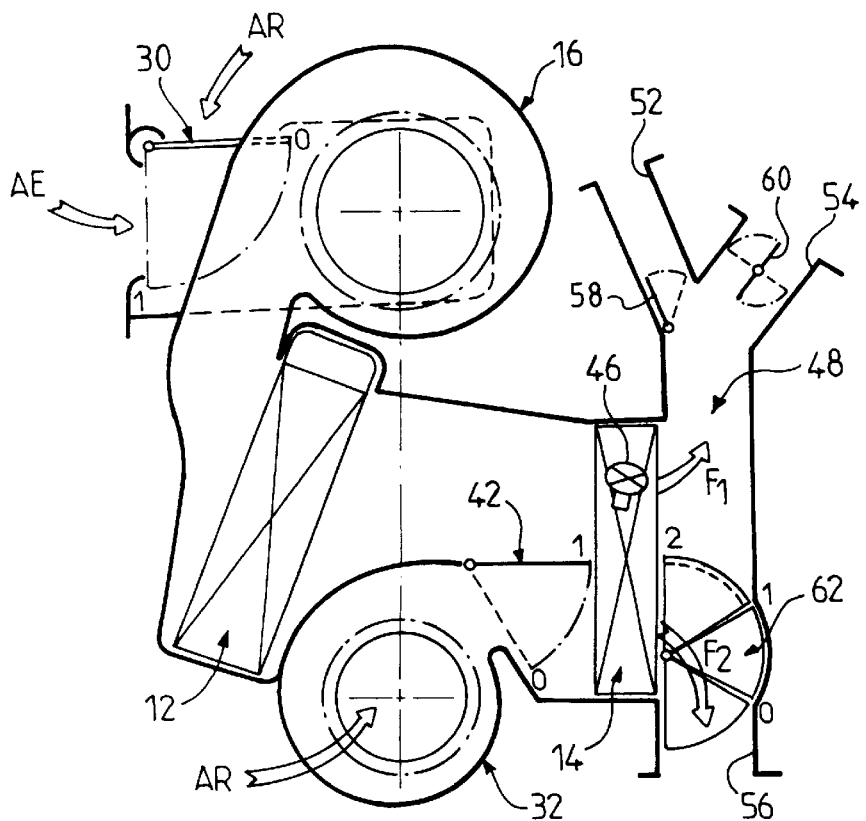
FIG. 7 is a view in section of a device according to a fifth embodiment of the invention.

The device of FIG. 7 is very similar to that of FIG. 6 and differs from the latter by the fact that the shutter 62, also of the drum type, can assume three different positions:

position 0, in which the feet-level outlet 56 is isolated from the outlet chamber 48;

position 1, in which the outlets 52, 54 and 56 all communicate with the outlet chamber 48; and position 2, in which the outlets 52 and 54 communicate with a top part of the outlet chamber 48 whilst the feet-level outlet 56 communicates with a bottom part of the outlet chamber 48.

Table 4 below gives, by way of example, different distribution modes of the device according to the respective positions of the shutters and the operating modes of the shutters.

TABLE 4

| Distribution modes | Shutter 42 | Shutter 62 | Shutter 30 | Fan 16 | Fan 32 |
|---|---|---|---|---|---|
| Deicing | 0 | 0 | 0 | 1 | 0 |
| Deicing + Heating | 1 | 2 | 0 | 1 | 1 |
| Heating | 1 | 1 | 0 or 1 | 1 | 0 |
| Heating + Ventilation | 1 | 2 | 0 | 1 | 1 |
| Ventilation | 0 | 0 | 0 or 1 | 1 | 0 |

Figure 8:
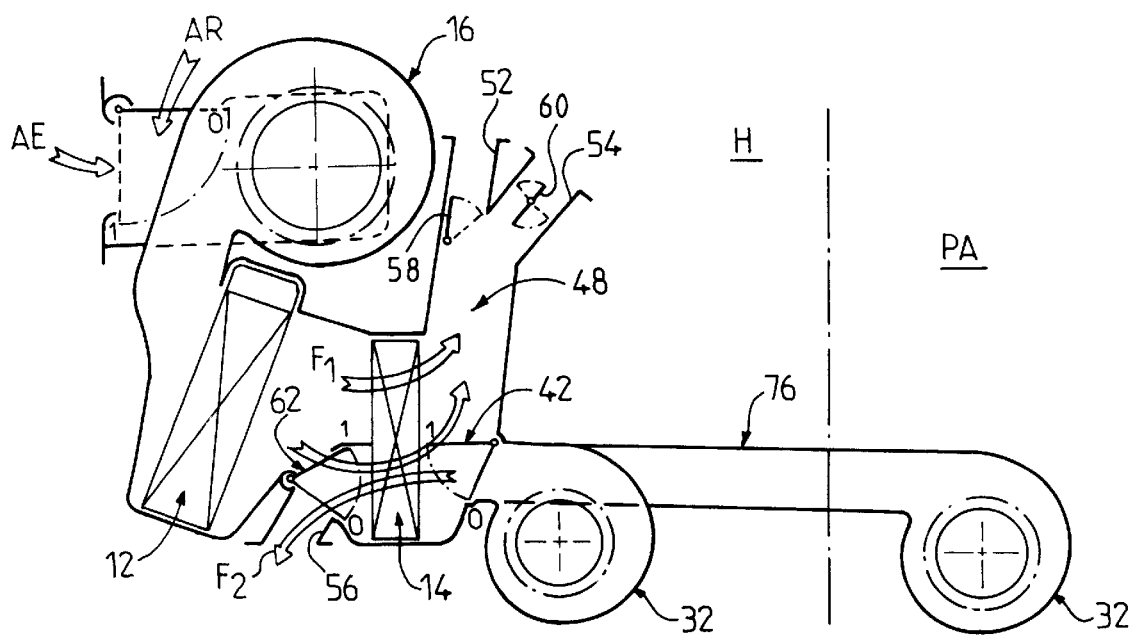
FIG. 8 is a side view of a device according to a sixth embodiment of the invention.

The device of FIG. 8 differs somewhat from the previous devices.

As in the previous embodiments, the first fan 16 is disposed on the upstream side of the radiator. On the other hand, the second fan 32 is disposed on the other side, that is to say the downstream side, of the radiator. The deicing 52 and ventilation 54 outlets both communicate with the outlet chamber 48. On the other hand, the feet-level outlet 56 communicates with a bottom part of the casing 10 on the upstream side of the radiator. As a result the first air flow F1 and the second air flow F2 pass through the radiator, that is to say respectively its parts 14A and 14B, in opposite directions.

As in the previous embodiments, a shutter 42 of the flag type mounted so as to pivot about a shaft 44 is provided at the outlet of the fan 32. However, this shutter 42 is here situated downstream of the radiator 14, that is to say on the same side as the outlet chamber 48. This shutter 42 can adopt two different positions:

a position 0, in which the outlet of the fan 32 is closed; and
a position 1 in which the outlet of the fan is open and the shutter channels the flow F2 so that it passes through the lower part 14B of the radiator 14.

In addition, the device comprises a shutter 62 similar to that in the previous embodiments, but here situated upstream of the radiator 14, that is to say between the evaporator 12 and the radiator 14. The shutter 62 is able to control the feet-level outlet 56 and can adopt two different positions: position 0, in which the feet-level outlet 56 is closed, and position 1, in which the feet-level outlet 56 is open and the flow F2 is channelled to this feet-level outlet 56.

In the case in FIG. 8, the fan 16 is situated adjacent to the casing 10 and the second fan 32 can be situated adjacent to the casing.

As a variant, the second fan can be situated at a distance from the casing (see right-hand part of FIG. 8), in particular in the area of the rear seats PA of the vehicle. In this case, it is necessary to provide a connecting conduit 76 between the fan 32 and the casing 10. Disposing the fan 62 at a distance from the casing can be advantageous in increasing the compactness of the device and also for taking off recirculated air in the region of the rear seats PA of the passenger compartment.

Figure 9:
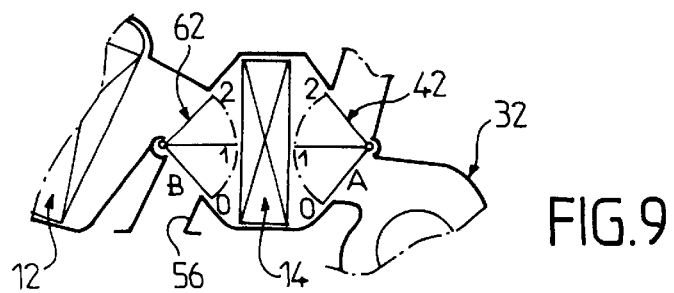
FIG. 9 is a detail of FIG. 8 in a variant embodiment.
Figure 10:
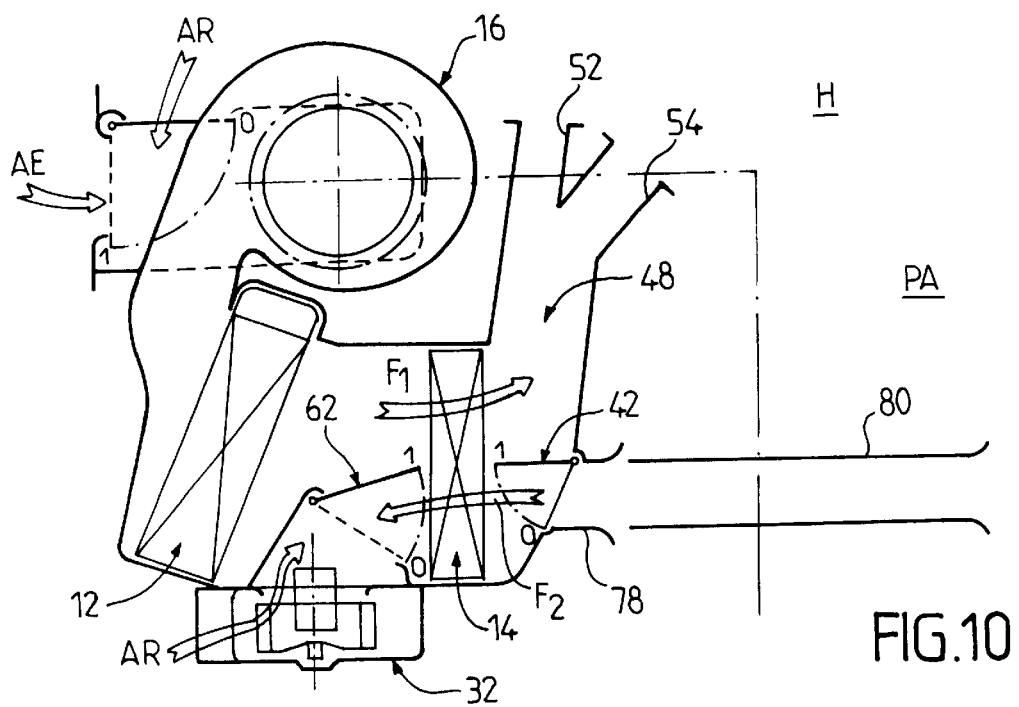
FIG. 10 is a view in section of a device according to a seventh embodiment of the invention.

In the variant in FIG. 9, which is similar to that of FIG. 8, the shutter 42 can also occupy a third position, or position 2, in which the flow F2, can completely pass through the radiator 14. Likewise, the shutter 62 can occupy a third position, or position 2, in which the flow F2, which has passed through the entire radiator 14, can be directed to the feet-level outlet 56.

Table 5 below gives, by way of example, different distribution modes for the device of FIG. 8 or FIG. 9.

TABLE 5

| Distribution modes | Shutter 42 | Shutter 62 | Shutter 30 | Fan 16 | Fan 32 |
|---|---|---|---|---|---|
| Deicing | 0 | 0 | 0 | 1 | 0 |
| Deicing + Heating | 1 | 1 | 0 | 1 | 1 |
| Heating | 1 (2) | 1 (2) | 0 or 1 | 0 | 1 |
| Heating + Ventilation | 1 | 1 | 0 | 1 | 1 |
| Ventilation | 0 | 0 | 0 or 1 | 1 | 0 |

The device according to FIG. 2 is similar to that of FIG. 8 in that the flows F1 and F2 pass through the radiator in opposite directions. However, the fan 32 is situated upstream of the radiator 14, that is to say close to the evaporator 12, rather than downstream of the radiator 14 close to the distribution casing 50. As a result the fan 32 must be of the suction type rather than of the blowing type. The flow F2 is taken off through an air inlet 78 which is controlled by the shutter 42 and which opens out in the passenger compartment H either at the front seats or at the rear seats PA, provided that, in the latter case, a conduit 80 is used.

Figure 11:
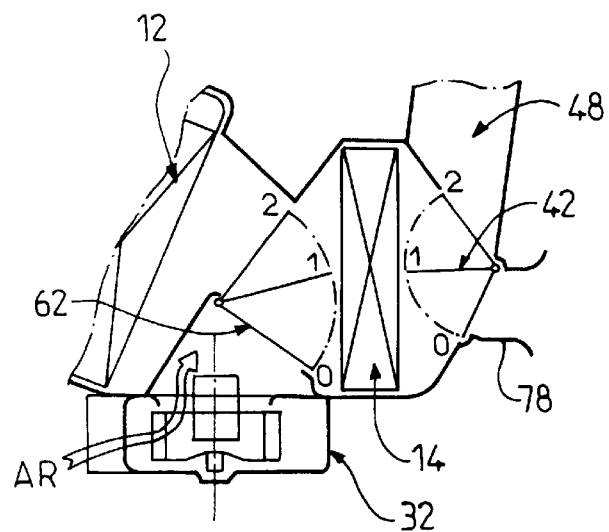
FIG. 11 is a detail of FIG. 10 in a variant embodiment.

The variant in FIG. 11 is similar to that of FIG. 9, in that the shutters 42 and 62 can each occupy three different positions identified by the figures 0, 1 and 2.

Figure 12:
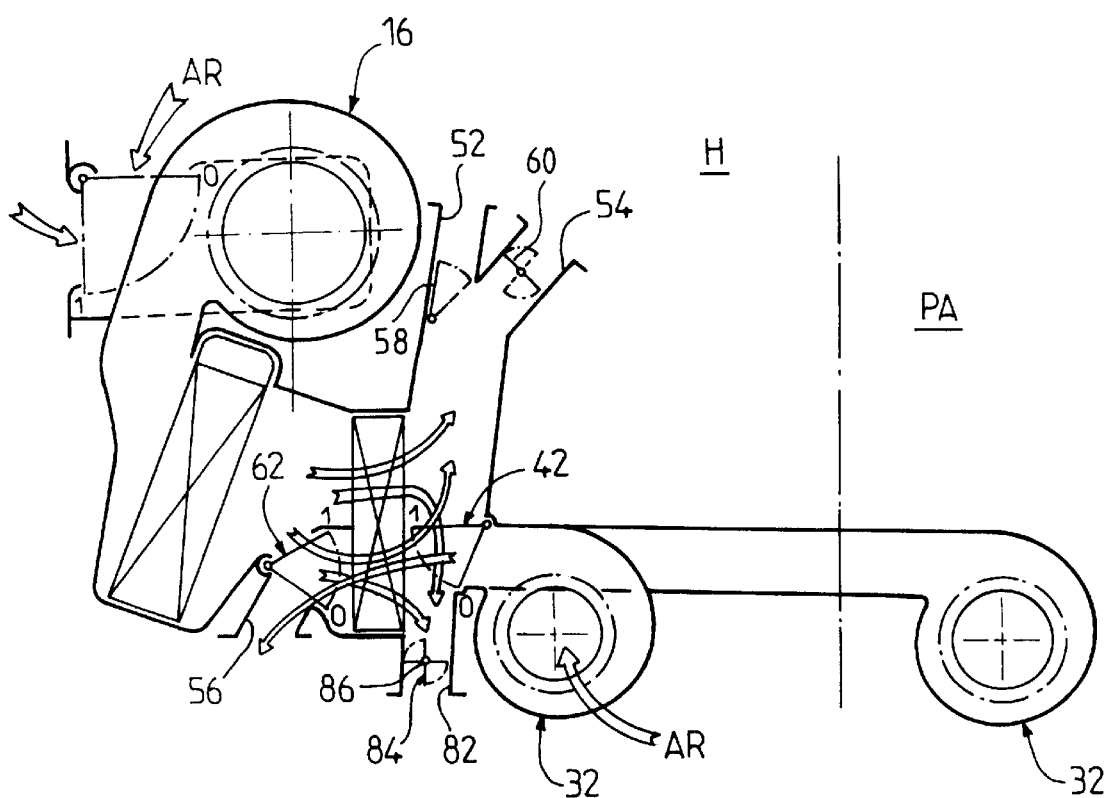
FIG. 12 is a view in section of a device according to an eighth embodiment of the invention.

The device depicted in FIG. 12 is similar to that of FIG. 8. It also has a second feet-level outlet 82 which is situated downstream of the radiator 14, in the lower part of the distribution casing 50. This outlet 82 is controlled by a shutter 84 of the butterfly type mounted so as to pivot about a shaft 86.

Table 6 below gives, by way of example, different distribution modes of the device of FIG. 12.

TABLE 6

| Distribution modes | Shutter 42 | Shutter 62 | Shutter 30 | Fan 16 | Fan 32 | |
|---|---|---|---|---|---|---|
| Deicing | 0 | 0 | 0 | 1 | 0 | |
| Deicing + Heating | 1 | 1 | 0 | 1 | 1 | outlet 56 |
| Heating | 0 | 0 | 0 or 1 | 1 | 0 | outlet 82 |
| Heating + Ventilation | 1 | 1 | 0 | 1 | 1 | outlet 56 |
| Ventilation | 0 | 0 | 0 or 1 | 1 | 0 | |

A brief description will now be given, with reference to FIGS. 13 to 19, of different variant locations of the fans 16 and 32. In these different variants, two independent single fans are used, that is to say ones each actuated by independent electric motors.

Figure 13:
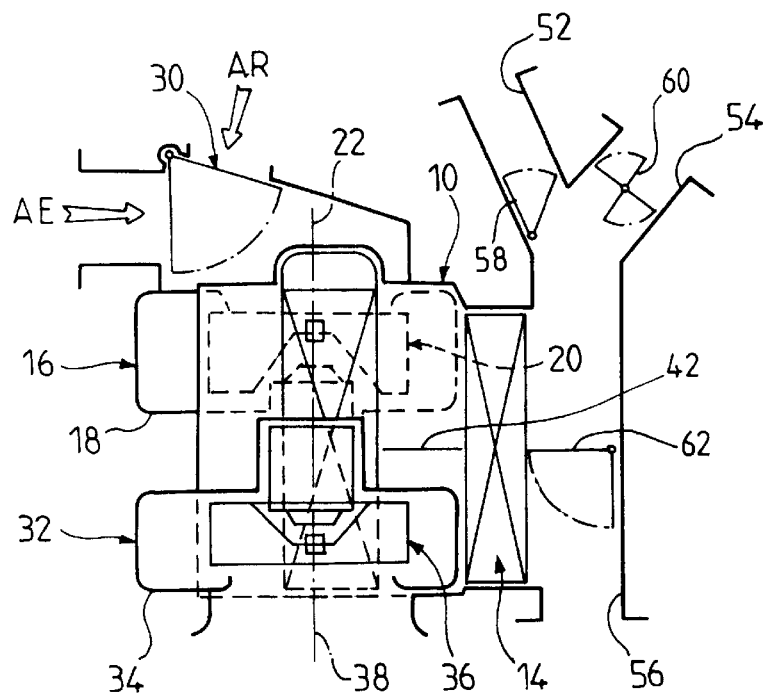
FIG. 13 is a view in section of a device with two single fans according to a first embodiment of the invention.
Figure 14:
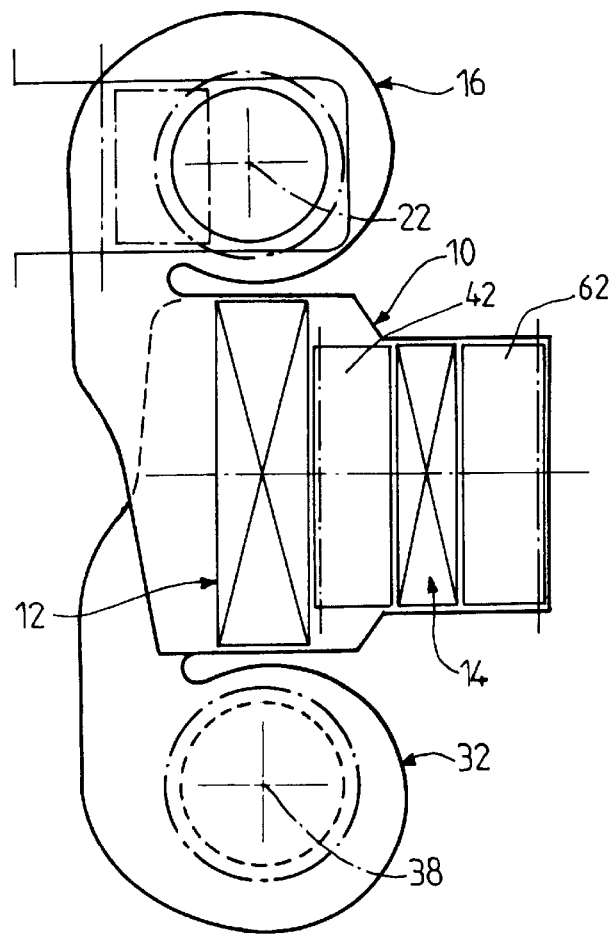
FIG. 14 is a plan view of the device of FIG. 13.

In the variant location in FIGS. 13 and 14, the fans 16 and 32 are of the radial type and have their respective shells 18 and 34 situated on each side of the casing. The respective axes 22 and 38 of the propellers are parallel to each other. The device comprises a shutter 42 of the flag type and a shutter 62 of the flag type pivotally mounted respectively upstream and downstream of the radiator 14.

Figure 15:
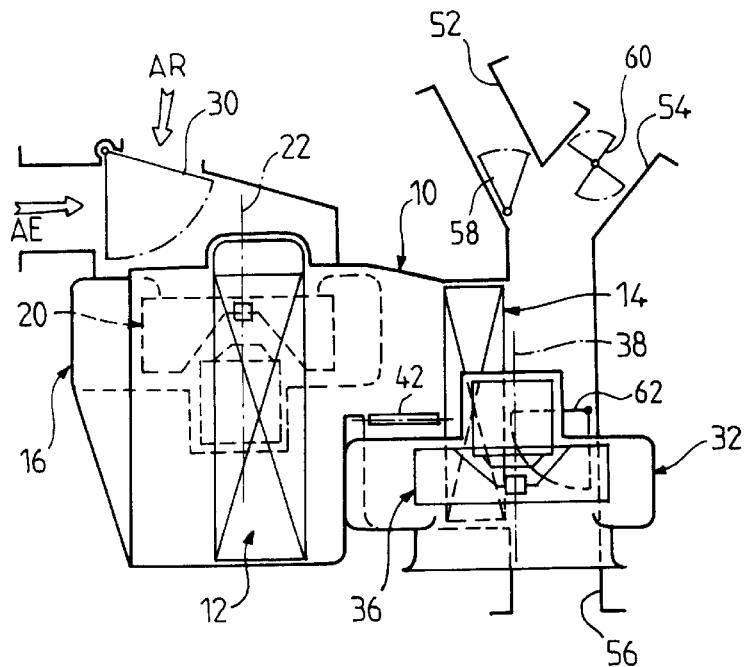
FIG. 15 is a view in section of a device with two single fans according to a second embodiment of the invention.
Figure 16:
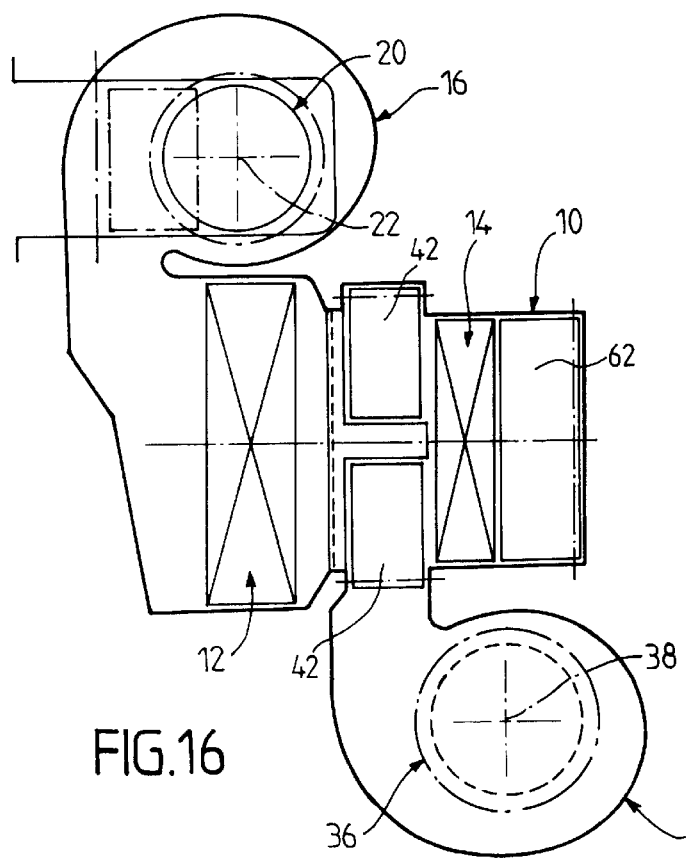
FIG. 16 is a plan view of the device of FIG. 15.

In the variant in FIGS. 15 and 16, the fans 16 and 32 are also of the radial type and are disposed in opposite orientations with the respective axes 22 and 38 of the propellers disposed substantially parallel. The fans 16 and 32 are disposed on each side of the casing, as in the case of FIG. 4. However, the axis 22 of the fan 16 is situated practically in the plane of the evaporator 12, whilst the axis 38 of the fan 16 is offset with respect to the aforementioned plane. In fact, the outlet of the fan 16 emerges upstream of the evaporator 12, whilst the outlet of the fan 32 emerges directly in the casing between the evaporator 12 and radiator 14. The device comprises two shutters 42 of the flag type pivotally mounted upstream of the radiator 14 and a shutter 62 of the flag type pivotally mounted downstream of the radiator 14. The shutters 42 have parallel pivot axes and are controlled in coordination so as to be in the open position and together in the closed position. In the open position, the air flows coming respectively from the fans 16 to 32 are channelled and layered at the entry to the radiator 14.

Figure 17:
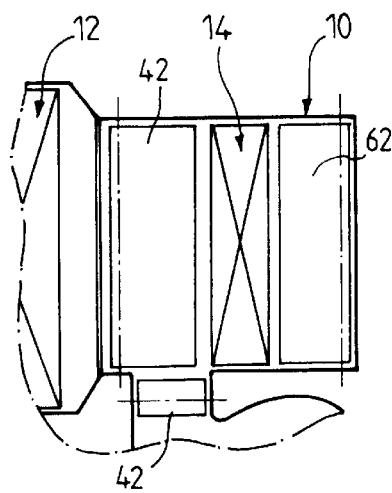
FIG. 17 is a detail of FIG. 16 in a variant embodiment.

In the variant in FIGS. 17, the outlet of the fan 32 also emerges between the evaporator 12 and radiator 14, but in a different configuration. The device also comprises two shutters 42 of the flag type, but these have pivot axes disposed perpendicularly to each other.

Figure 18:
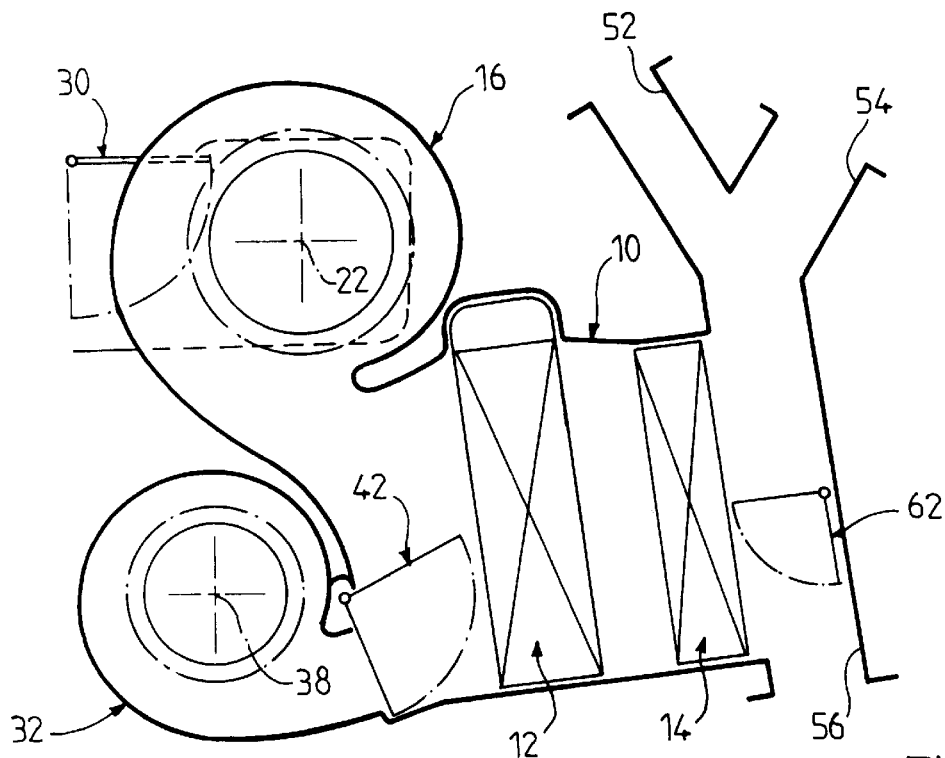
FIG. 18 is a view in section of a device with two single fans according to a third embodiment of the invention.

In the embodiment in FIG. 18, the fans 16 and 32 are also of the radial type and have their respective housings 18 and 34 disposed adjacent with the respective axes 22 and 38 of the propellers extending parallel to each other. The shells open out directly in the casing 10 upstream of the evaporator 12.

Figure 19:
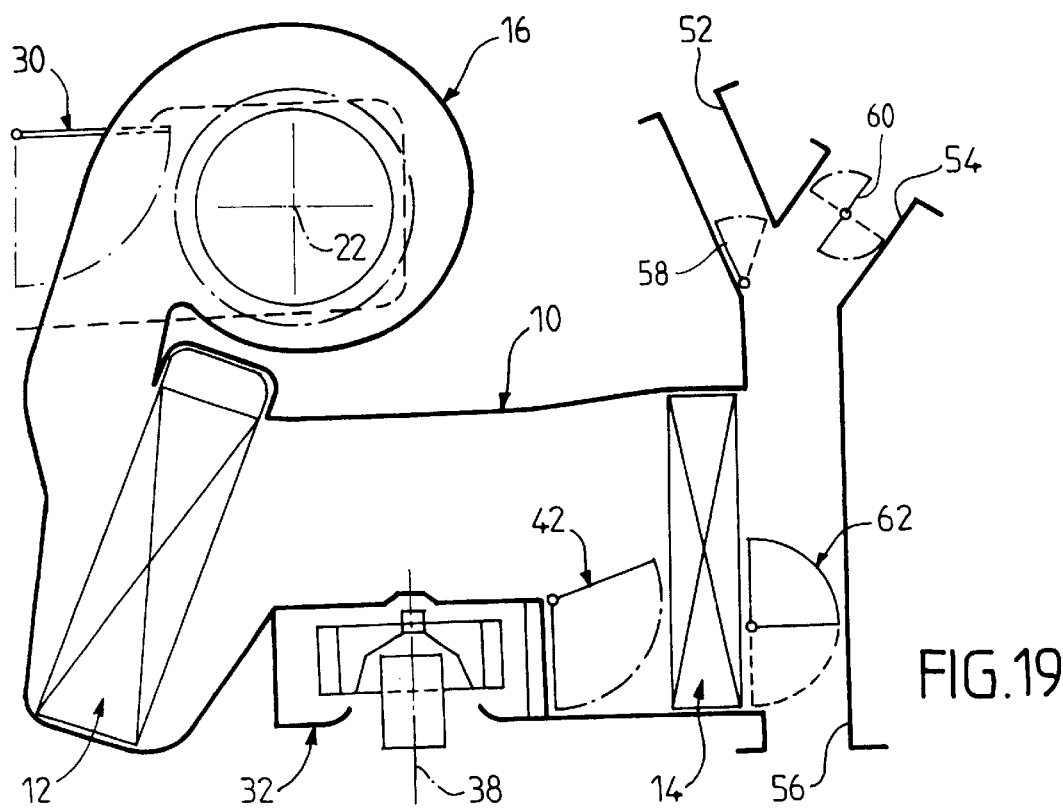
FIG. 19 is a view in section of a device with two single fans according to a fourth embodiment of the invention.

In the embodiment in FIG. 19, the fans 16 and 32 are also of the radial type. The shell 18 of the fan 16 is situated close to the casing 10 and communicates directly with the inlet of the evaporator 12. The fan 32 is disposed close to the casing between the evaporator 12 and radiator 14. The shell 34 can be integrated into the casing. The respective axes 22 and 38 of the propellers are octagonal.

A brief description will now be given, with reference to FIGS. 20 to 23, of different variant locations in the case of two single fans.

Figure 20:
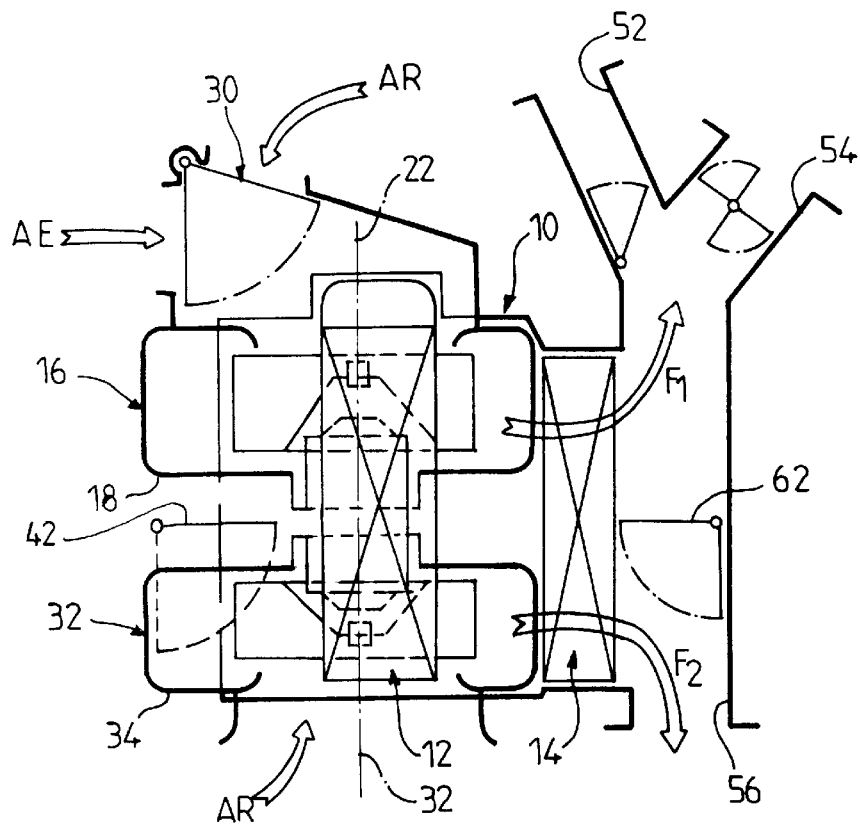
FIG. 20 is a view in section of a device with a double fan according to a first embodiment of the invention.
Figure 21:
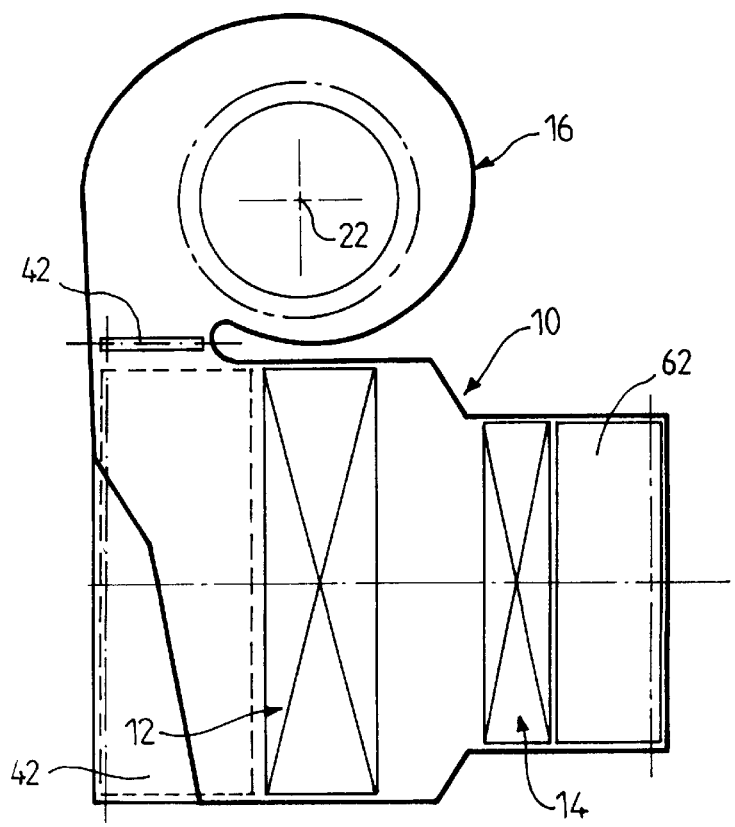
FIG. 21 is a plan view of the device of FIG. 20.

In the variant in FIGS. 20 and 21, the shells 18 and 34 of the fans 16 and 32 are adjacent, and the respective axes of the propellers are merged. The shells 18 and 34 are situated in the immediate vicinity of the casing 10.

Figure 22:
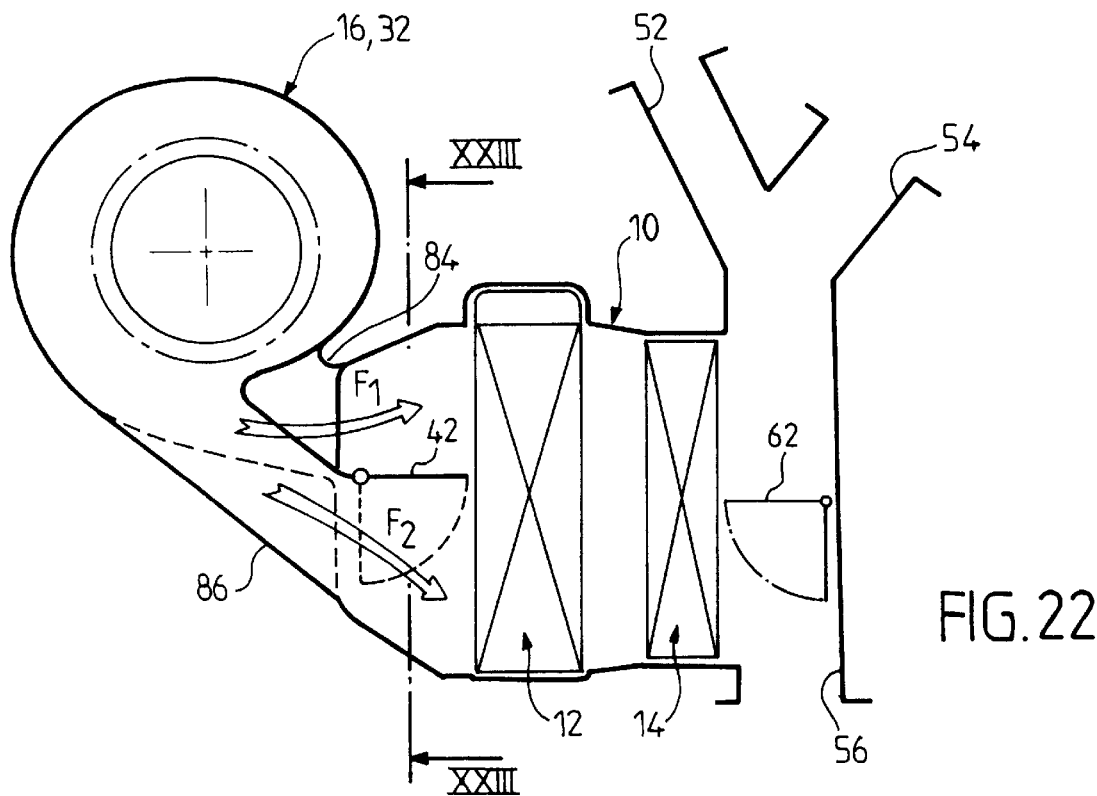
FIG. 22 is a view in section of a device with a double fan according to a second embodiment of the invention.
Figure 23:
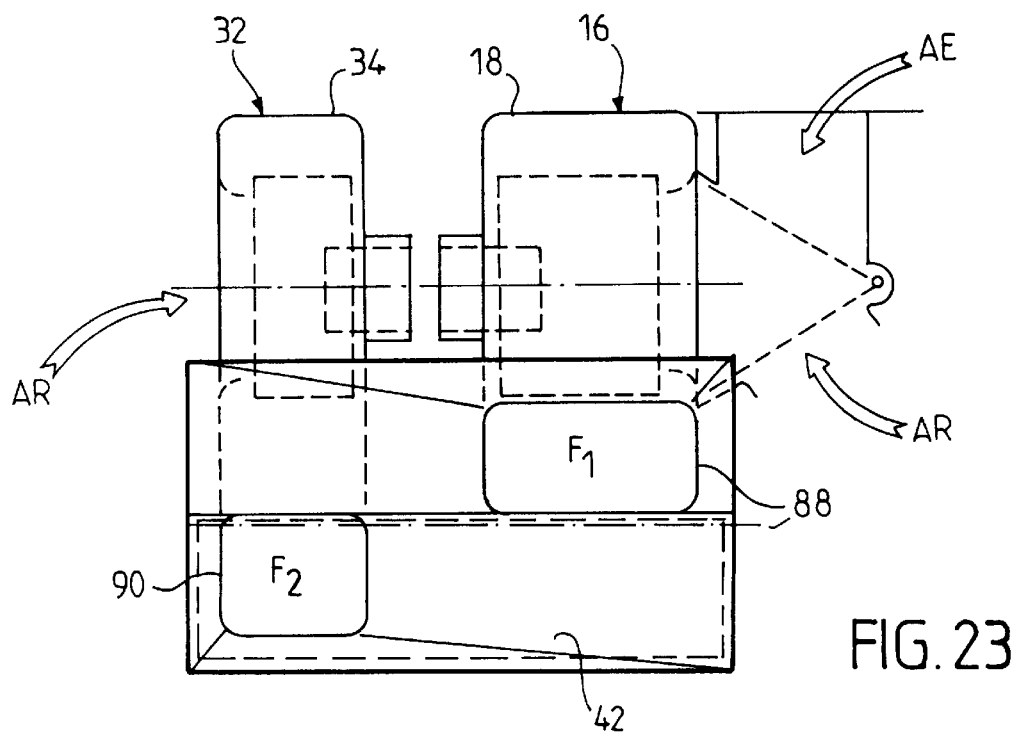
FIG. 23 is a view in section along the line XXIII—XXIII in FIG. 22.

In the variant in FIGS. 22 and 23, the shells 18 and 34 are situated in the immediate vicinity of the casing and have outlet conduits 84, 85 connected upstream of the casing 10 enable to convey respectively the air flow F1 and the air flow F2. As can be seen in FIG. 23, the shells 18 and 34 are attached to a side wall of the casing 10 and have respective outlet conduits 88 and 90 able to convey respectively the air flows F1 and F2. The device comprises two shutters 42 placed at the outlet of the fans and mounted so as to pivot about respective shafts perpendicular to each other.

Reference is now made to FIGS. 24 to 28, which concern devices of the type for temperature regulation by mixing on air.

Figure 24:
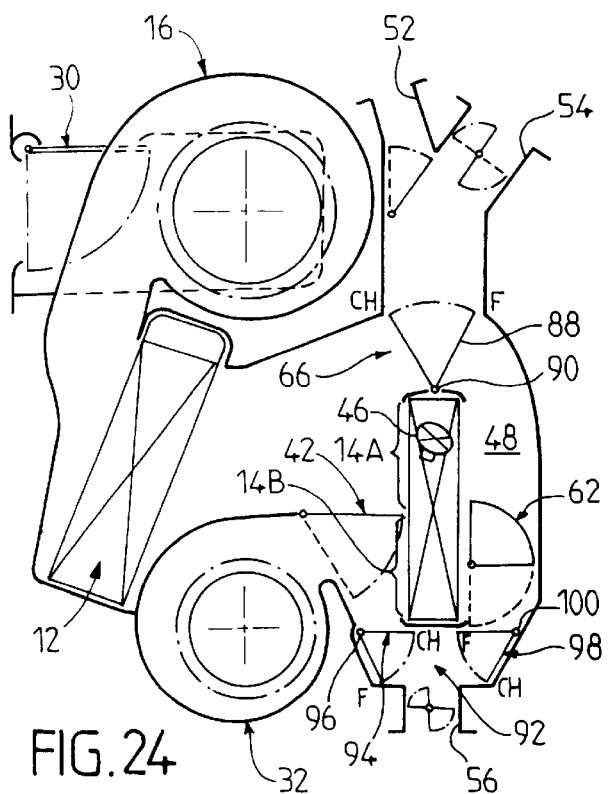
FIG. 24 is a view in section of a device of the type for temperature regulation by mixing on air according to a first embodiment of the invention.

The device in FIG. 24 is similar to that of FIG. 2, in that there is also found an upper air passage 66 provided in the casing close to the first part 14A of the radiator and communicating with the outlet chamber 48. This air passage is here controlled by a shutter 88 of the flag type mounted so as to pivot about a shaft 90. This shutter can occupy a hot position "CH" in which the upper air passage 66 is closed and the air flow F1 is obliged to pass through the radiator 14 in order to reach the outlets 52 and 54. It can also occupy a cold position "F" in which the air flow F1 directly reaches the outlets 52 and 54 without passing through the radiator. This shutter 88 can also occupy intermediate positions in order to adjust the temperature of the air flow reaching the outlets 52 and 54.

In the case of FIG. 24, the shutters 42 and 62 of FIG. 2 are also found. In addition, the device comprises a lower air passage 92 provided in the casing 10, close to the second part 14B of the radiator and close to the feet-level outlet 56. This passage 92 also communicates with the outlet chamber 48 provided downstream of the radiator.

This air passage is controlled by two shutters, a shutter 94 of the flag type mounted so as to pivot about a shaft 96 and a shutter 98 also of the flag type mounted so as to pivot about a shaft 100.

The shutters 94 and 98 are situated respectively on the upstream side and downstream side of the radiator 14 and notably ensure mixing of the air in the lower part of the casing.

Figure 25:
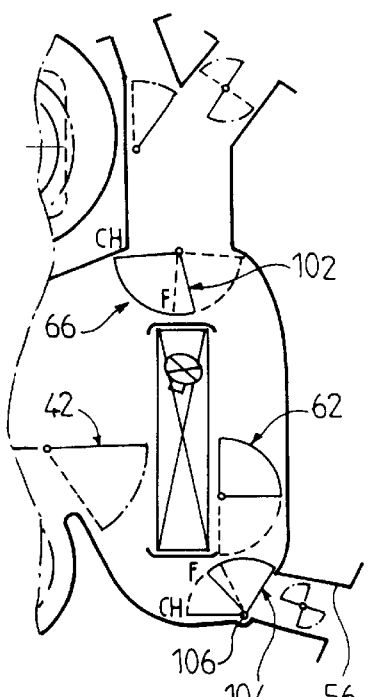
FIG. 25 is a detail embodiment of FIG. 24 in a variant.

In the variant in FIG. 25, the upper air passage 66 is controlled by a shutter 102 of the drum type which fulfils substantially the same functions as the shutter 88 in FIG. 24.

The lower air passage 92 is here controlled by a single shutter 104 in place of the two shutters 94 and 98 described previously. This shutter 104 is mounted so as to pivot about a shaft 106.

Figure 26:
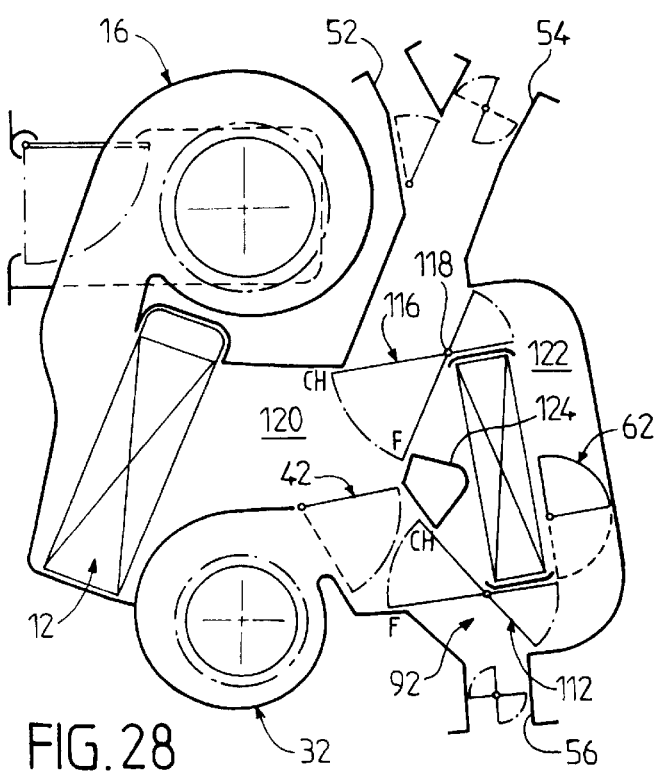
FIG. 26 is a detail embodiment of FIG. 24 in another variant.

In the variant in FIG. 26, the shutter 104 is replaced by a shutter 108 of the flag type mounted so as to pivot about a shaft 110.

Figure 27:
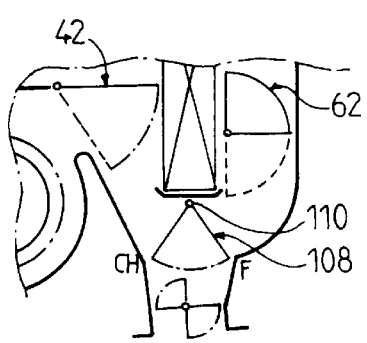
FIG. 27 is a detail embodiment of FIG. 24 in another variant.

In the embodiment in FIG. 27, the lower air passage 92 is controlled by a shutter 112 of the butterfly type mounted so as to pivot about a shaft 114.

Figure 28:
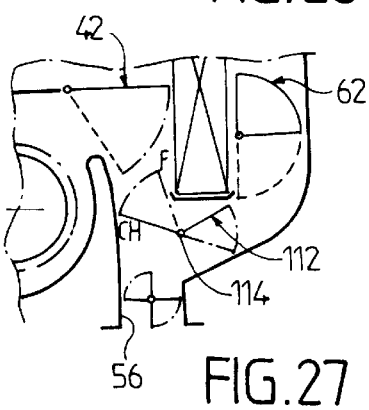
FIG. 28 is a view in section of a device for temperature regulation by mixing on air according to a second embodiment of the invention.

In the variant in FIG. 28, a shutter 112 of the butterfly type for controlling the lower air passage 92 is also found.

The upper air passage 66 is controlled by a mixing shutter 116 mounted so as to pivot about a shaft 118. This shutter is situated at the junction of a cold air transmission branch 120 and an air heating branch 122 in which the radiator 14 is housed. This shutter makes it possible to adjust the temperature of the air reaching the outlets 52 and 54 by a technique of regulation in air. The shutter 116 can occupy a cold position "F" in which the air flow F1 is directed to the outlets 52 and 54 without being able to pass through the radiator 14 and a hot position "CH" in which the air flow is obliged to pass through the radiator 14 in order to reach the outlets 52 and 54. The shutter 116 can occupy a multiplicity of intermediate positions to enable the temperature of the air flow to be regulated by mixing a hot air flow and a cold air flow according to a technique known per se.

The casing 10 houses on the inside a stop 124 serving to limit the movement of the shutter 112 and the movement of the shutter 116.

Figure 29:
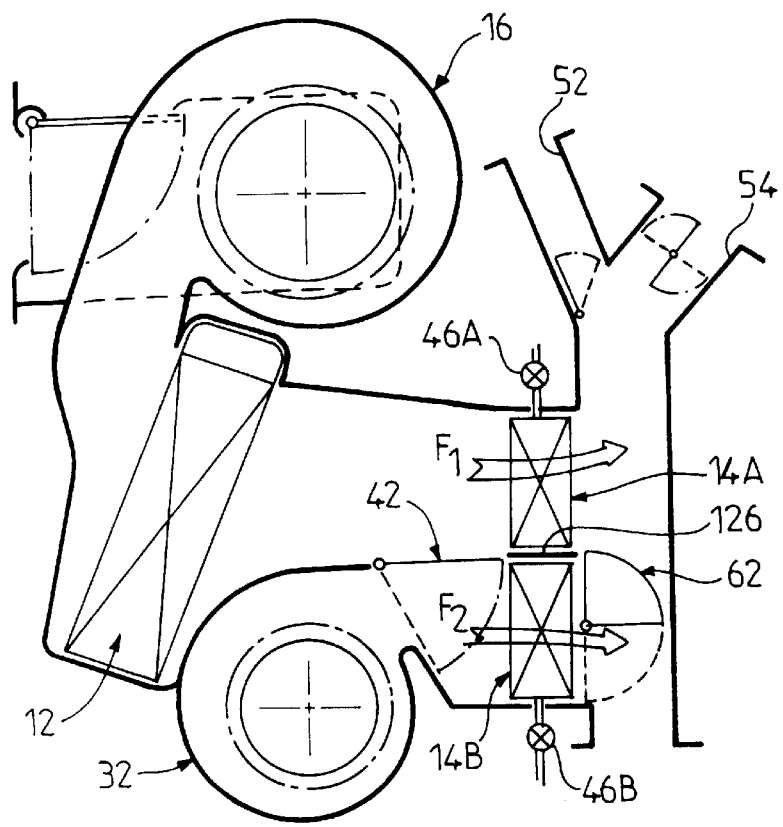
FIG. 29 is a view in section of a device according to the invention with two radiators.

The device of FIG. 29 is similar to that of FIG. 1 except that the radiator 14 is formed by the joining of two adjacent independent radiators 14A and 14B able to have the flows F1 and F2 respectively pass through them. These two radiators are fed by a hot fluid under the control of valves 46A and 46B, both with progressive regulation. A partition 126 is provided between the radiators 14A and 14B in order to contribute to the separation of the flows F1 and F2.

Figure 30:
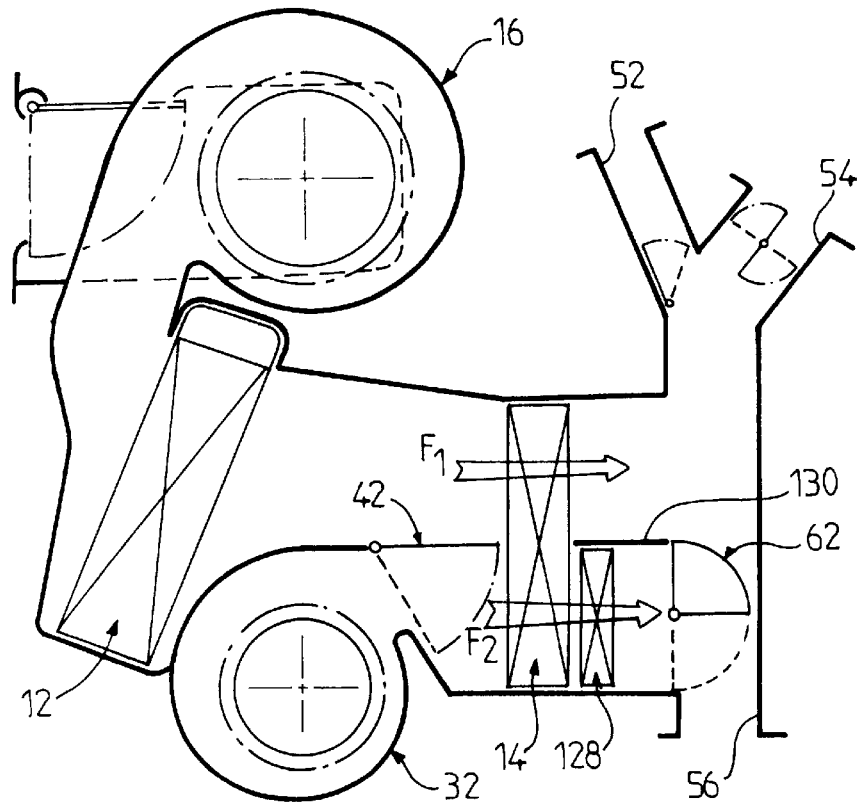
FIG. 30 is a view in section of a device similar to that of FIG. 29, comprising a single radiator and an additional radiator.

The device of FIG. 30 is similar to that of FIG. 1, and also comprises an additional radiator 128 situated opposite the second part 14A of the radiator and able also to have the second air flow F2 pass through it. This radiator is advantageously of the electric type. This makes it possible to increase the temperature of the flow F2 and to promote the temperature rise of the lower area of the passenger compartment, in the region of the feet of the passenger.

Figure 31A:
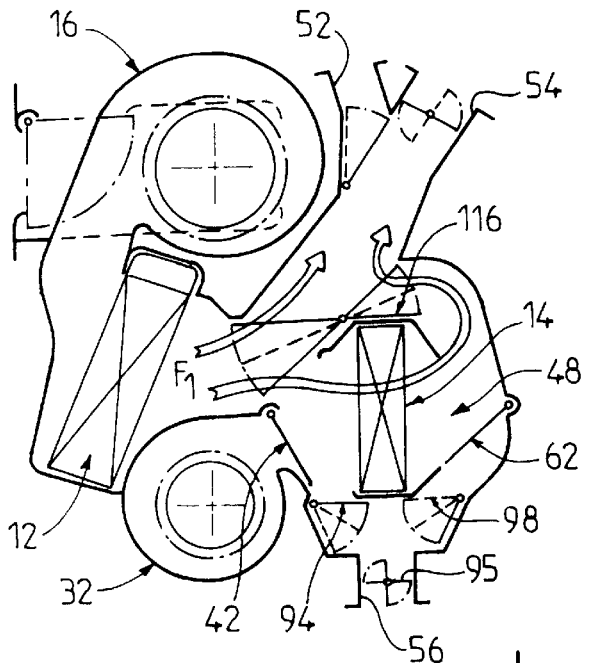
FIGS. 31A to 31C show different configurations of a device according to the invention of the mixing on air type.
Figure 31B:
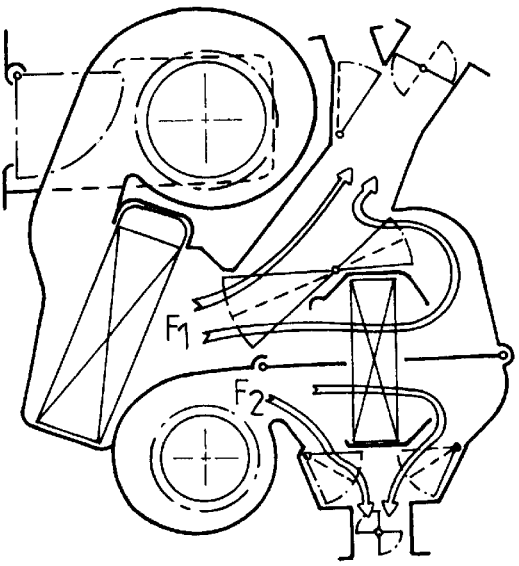
Figure 31C:
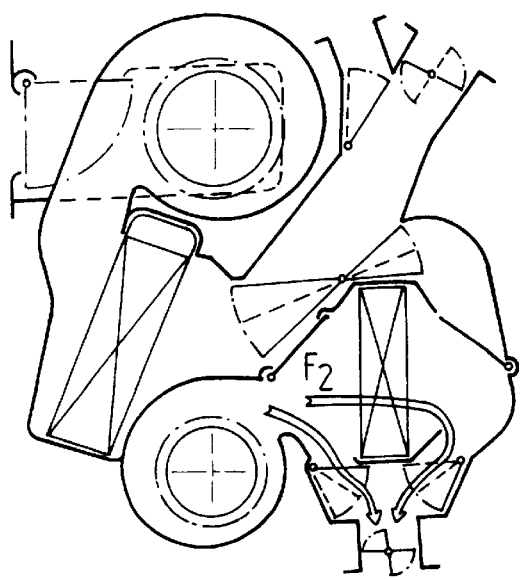

Reference is now made to FIGS. 31A and 31C showing different distribution modes of a device according to the invention similar to those described in FIGS. 24 and 28. The device comprises notably an upper air passage 66 in which a mixing shutter 116 is placed and a lower air passage 92 in which two shutters 94 and 98 are placed. The outlet of the fan 32 is controlled by a shutter 42, whilst a shutter 62 of the flag type is provided in the outlet chamber 48.

FIG. 31A corresponds to a distribution mode: "deicing and ventilation". The fan 16 is in operation, whilst the fan 32 is stopped, its outlet also being closed by the shutter 42. The shutters 94 and 98 can be in a variable position, whilst the shutter 95 closes off the access to the feet-level outlet 56. The shutter 62 is in a position such that the air flow which has passed through the radiator 14 is directed to the deicing outlet 52 and ventilation outlet 54. The air flow emitted by the fan 16 passes through the evaporator and is then distributed between the cold air transmission branch 120 and the air heating branch 122 by the mixing shutter.

In the position in FIG. 31B, the device is in the "heating+ deicing and heating+ventilation" distribution mode.

The fans 16 and 32 are both in operation. The shutter 42 is open and the shutter 62 is in an intermediate position. In addition, the shutters 94 and 98 are in any position. The radiator 14 has a flow F1 pass through it in the upper part and a flow F2 in the lower part, the shutters 42 and 62 helping to partition these two flows.

The deicing 52 and ventilation 54 outlets are fed by an air flow at regulated temperature. The feet-level outlet 56 is fed by a hot or mixed-temperature air flow which comes from the fan 32 and which has passed through the lower part of the radiator.

In the position of 31C, the device is in a so-called "feet-level heating" distribution mode.

The fan 16 is stopped, whilst the fan 32 is in operation. The shutter 42 is in the fully open position; the shutter 62 is in a position such that the air flow which has passed through the radiator 14 is directed to the feet level outlet 56. As in the previous embodiment, the shutters 94 and 98 can be adjusted for position in order to adjust the temperature of the air sent to the feet level outlet, varying the proportion of the air flow passing through the radiator and the air flow which does not pass through the radiator.

The device in FIG. 31A to 31C can function equally well in a configuration where the mixing controls are combined or in a configuration where the mixing controls are independent.

In the first case, the functioning of the mixing shutter 116 and that of the mixing shutters 94 and 98 are combined. In the second case, the two operations are independent.

Reference is now made to FIGS. 32A to 32D showing a device which is similar to that of FIGS. 31A to 31C.

This device comprises an upper air passage 66 controlled by a mixing shutter 116 similar to that of FIG. 28. On the other hand, the device does not have a lower air passage 92 as in the case of FIGS. 24, 28, 31A to 31C.

The mixing shutter 116 makes it possible to regulate both the temperature of the air flow sent to the deicing outlet 52 and ventilation outlet 54 and that of the air flow sent to the feet-level outlet 56.

The device comprises a mixing chamber 130 receiving air at regulated temperature and feeding on the one hand the outlets 52 and 54 and on the other hand the feet-level outlet 56 through a conduit 132, which can communicate with the outlet chamber 48 through a shutter 134 of the butterfly type mounted so as to pivot about a shaft 136.

Figure 32A:
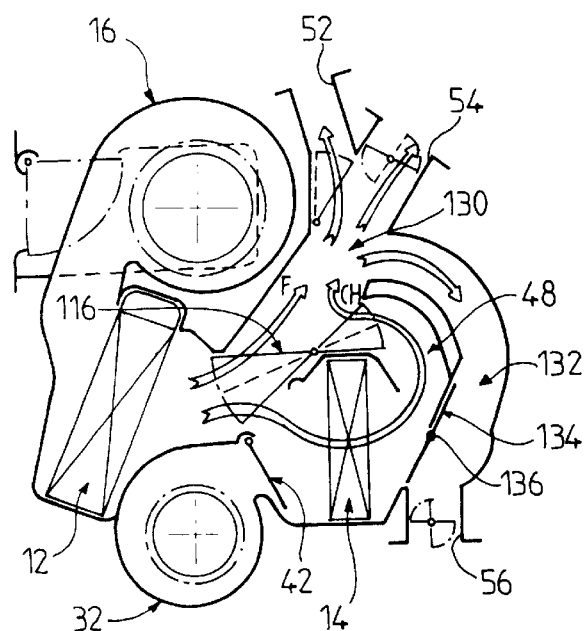
FIGS. 32A to 32D show different configurations of another device according to the invention for regulation on air.

In the position in FIG. 32A, the fan 16 is in operation, whilst the fan 32 is stopped, its outlet being closed by the shutter 42. The shutter 134 is in a position in which the conduit 132 is isolated from the outlet chamber 48. The mixing chamber 130 is fed by an air flow at adjusted temperature, dependent on the position of the mixing shutter. The air flow at adjusted temperature is then distributed between the outlets 52, 54 and 56.

Figure 32B:
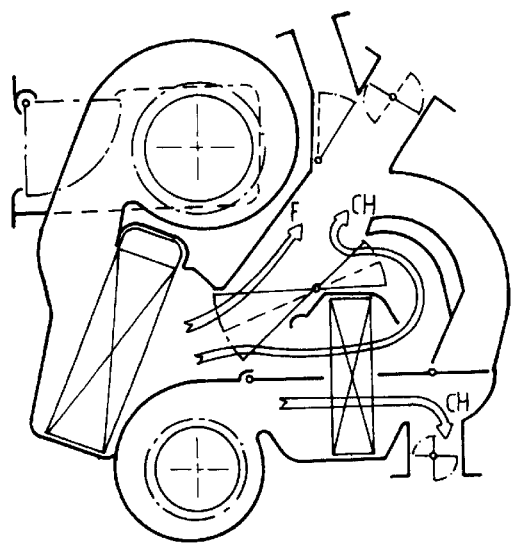

In the position in FIG. 32B, the fans 16 and 32 are both in operation. The shutters 42 and 134 are in a position such that the air flows issuing from the two fans are partitioned. The outlets 52 and 54 are fed by an air flow at regulated temperature coming from the fan 16. On the other hand, the feet-level outlet 56 is fed by an air flow which comes from the fan 32 and which has passed through the lower part of the radiator 14. In this configuration, mixed air is sent to the deicing and ventilation outlets, whilst the hot air is sent to the feet level outlet. This configuration is suitable for modes combined with extra heating of the feet-level area.

Figure 32C:
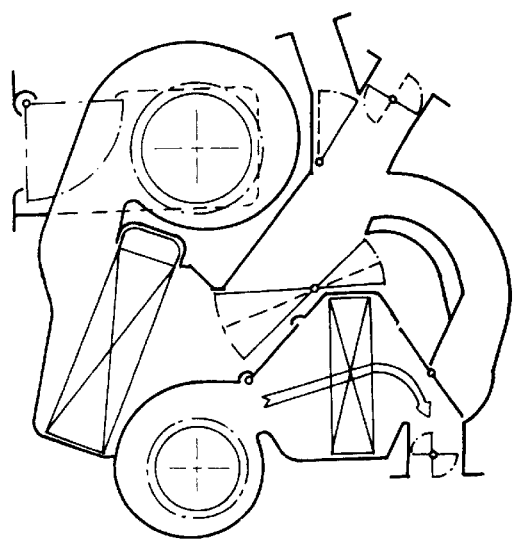

In the position in FIG. 32C, the device is in a configuration which corresponds to another "feet-level heating" mode.

The shutter 42 is in a fully open position, just like the shutter 134, so that all the air flow coming from the fan 32 passes through the complete section of the radiator 14. The hot flow issuing from the radiator is thus sent solely to the feet-level outlet 56. This operating mode makes it possible to bring the feet area of the passenger compartment rapidly to temperature.

Figure 32D:
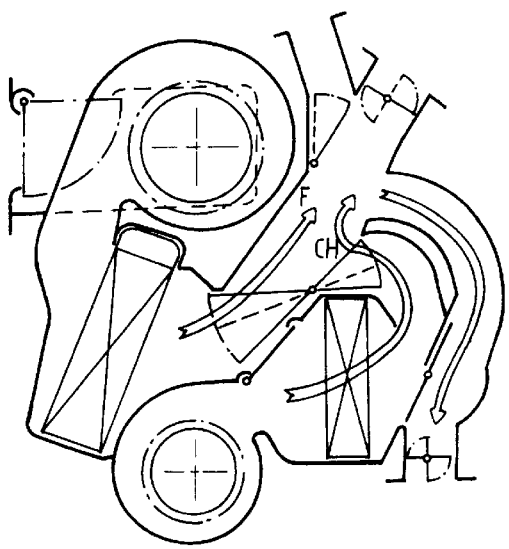

In the position in FIG. 32D, the device is another "feet-level heating" mode. The shutter 42 occupies the same position as in FIG. 32C. On the other hand, the shutter 134 isolates the conduit 132 from the outlet chamber 48. The mixing chamber 130 is fed on the one hand by a cold air flow coming from the fan 16 and on the other hand by a hot air flow which comes from the fan 32 and which has passed through the radiator 14. The mixing chamber thus receives a flow at adjusted temperature which can then be distributed between the outlets 52, 54 and 56. Consequently this mode makes it possible to adjust the temperature of the air flow sent to the aforementioned three outlets.

Figure 33A:
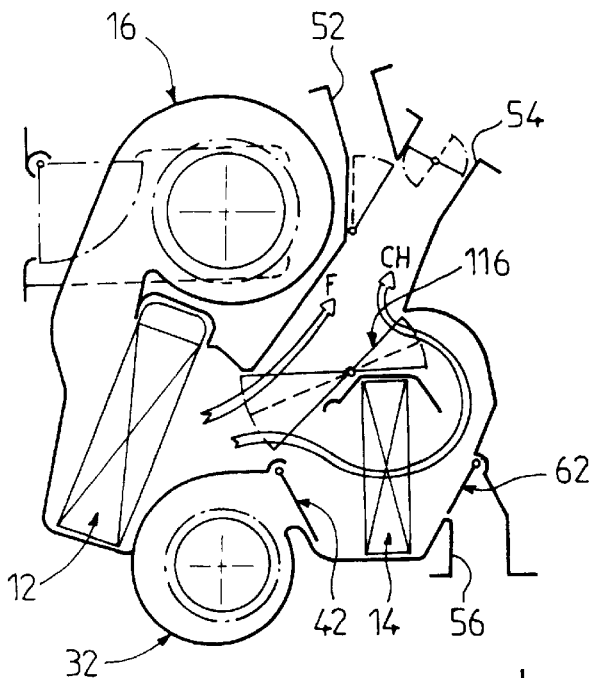
FIGS. 33A to 33C show different configurations of another device according to the invention for regulation on air.
Figure 33B:
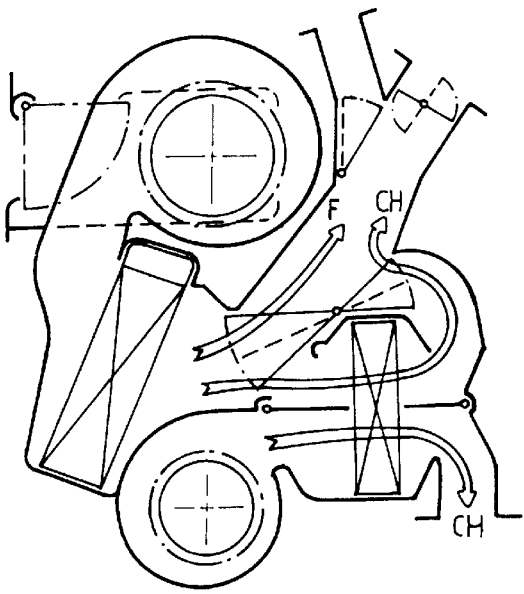
Figure 33C:
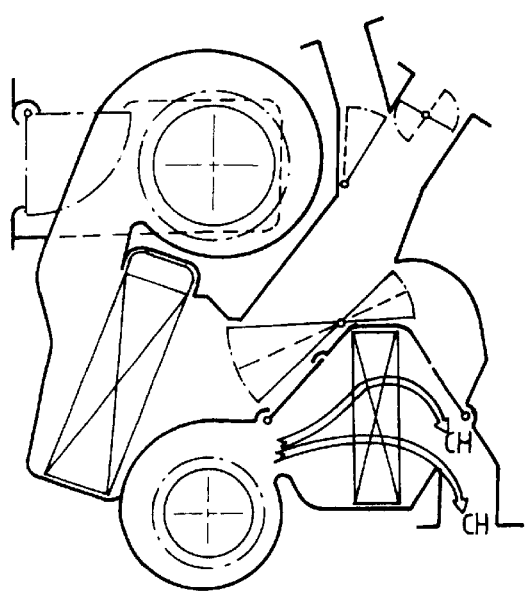

Reference is now made to FIGS. 33A to 33C, which show different distribution modes of a device produced according to a variant of the device of FIGS. 32A to 32C. Compared with the previous embodiment, the conduit 132 has been omitted. The outlet chamber 48 still houses a shutter 62, as described previously.

In the position in FIG. 33A, the device is in a "deicing or ventilation" mode.

The fan 16 is in operation, whilst the fan 32 is stopped, its outlet being closed by the shutter 42. The shutter 62 is in a position such that all the air flow which has passed through the radiator 14 is sent to the deicing outlet 52 and ventilation outlet 54. Thus these two outlets receive mixed air, whilst the feet-level outlet 56 is not fed.

In the position in FIG. 33B, the device is in a "deicing +ventilation" or "heating +deicing" mode.

The shutter 42 is in an intermediate position, just like the shutter 62, which makes it possible to partition the flows emitted respectively by the fan 16 and the fan 32, both in operation. The outlets 52 and 54 receive mixed air supplied by the fan 16. On the other hand, the feet-level outlet 56 receives hot air which has been emitted by the fan 32 and has passed through the lower outlet of the radiator 14.

In the position of FIG. 33C, the device is in a "feet-level heating" mode. The fan 16 is stopped, whilst the fan 32 is in operation. The shutters 42 and 62 are in a position such that all the air flow emitted by the fan 32 can pass through the radiator 14 and then be directed solely to the feet-level outlet 56. As a result the outlet 56 receives a hot air flow at maximum temperature.

Thus the device of FIGS. 33A to 33C constitutes a variant of that of FIGS. 32A to 32C, this variant being simplified in so far as it does not permit adjustment of the temperature of the feet-level heating.

It will be understood that the device of the invention is capable of numerous variant embodiments, notably with regard to the relative positions of the two fans with respect to the casing. These positions can be chosen according to the constraints relating to location and the size of the vehicle for which the device is intended.

The respective housings of the fans can either be attached to the casing or be integrated into it, being for example moulded in one piece with it.

In summary, the device of the invention makes it possible to diffuse two distinct air flows each having an origin external or internal to the vehicle. Preferably, the upper part of the passenger compartment will be fed with an external (or possibly recirculated) air flow so as to avoid misting of the vehicle windows. On the other hand, the lower part of the passenger compartment will preferably be fed with recirculated air in order notably to assist heating.

Thus the upper and lower parts of the passenger compartment of the vehicle can be fed with two air flows treated independently for temperature.

In addition, the device makes it possible to use one or two heat sources.

In the latter case, it is possible, for certain distribution modes, to unify the two heat sources in order to increase the thermal power.

What is claimed is:

1. A device for heating and/or air conditioning the passenger compartment of a motor vehicle comprising:
   a fan assembly disposed to send an air flow through a casing, the casing housing at least a heating radiator and communicating with a deicing outlet, a ventilation outlet, and a feet-level outlet,
   wherein the fan assembly comprises a first fan operable to send a first air flow through a first part of the heating radiator and a second fan operable to send a second air flow through a second part of the radiator, in that a first distribution means is provided in the casing, downstream of the first fan and the second fan and upstream of the radiator with respect to the second air flow, for controlling an amount of air flowing from the first fan or the second fan to a second distribution means for distributing the first and second air flows which have passed through the radiator, between the deicing outlet, the ventilation outlet, and the feet-level outlet, and wherein an evaporator is interposed between the first fan and the casing, so that the first air flow passes successively through the evaporator and the radiator, whereas the second air flow passes only through the radiator.

2. A device according to claim 1, wherein the first fan and the second fan are each able to be fed by an external air flow and/or a recirculated air flow.

3. A device according to claim 1, wherein the first part of the radiator is the top part and is situated on the same side as the deicing outlet and the ventilation outlet, whereas the second part of the radiator is the bottom part and is situated on the same side as the feet-level outlet.

4. A device according to claim 1, wherein the radiator has an upstream side and a downstream side and wherein the first fan and the second fan are both disposed on the upstream side of the radiator and wherein the deicing, ventilation and feet-level outlets communicate with an outlet chamber situated on the downstream side of the radiator so that the first air flow and the second air flow pass through the radiator in the same direction.

5. A device according to claim 4, wherein the outlet chamber houses the second distribution means, the second distribution means comprising a second distribution shutter able to adopt at least two different positions: a closed position in which the outlet chamber is divided into a first compartment and a second compartment so that the first air flow is directed to the deicing outlet and the ventilation outlet whereas the second air flow is directed to the feet-level outlet; and, an open position in which the first compartment and the second compartment communicate so that the first air flow and the second air flow can at least partly mix.

6. A device according to claim 1, wherein the first distribution means comprises a first distribution shutter provided at the outlet of the second fan in order to control the second air flow.

7. A device according to claim 6, wherein the first distribution shutter is able to adopt a closed position in which the outlet of the second fan is closed and at least one open position in which the outlet of the second fan is open.

8. A device according to claim 1, wherein the radiator includes first and second sides and wherein the first fan is disposed on said first side of the radiator whereas the second fan is disposed on the second side of the radiator and wherein the deicing and ventilation outlets communicate with an outlet chamber situated on the second side of the radiator, whereas the feet-level outlet communicates with a lower part of the casing on the first side of the radiator so that the first air flow and the second air flow pass through the radiator in opposite directions.

9. A device according to claim 8, wherein a distribution shutter is provided at the outlet of the second fan in order to control the second air flow.

10. A device according to claim 9, wherein the distribution shutter is able to adopt at least two positions: a closed position in which the outlet of the second fan is closed and an open position in which the outlet of the second fan is open.

11. A device according to claim 9, wherein the distribution shutter is situated on the first side of the radiator.

12. A device according to claim 8, wherein the first fan and the second fan are situated adjacent to the casing.

13. A device according to claim 8, wherein the first fan is situated adjacent to the casing, whereas the second fan is situated at a distance from the casing and close to the rear seats of the vehicle.

14. A device according to claim 1, wherein the first fan and the second fan are two independent fans.

15. A device according to claim 1, wherein the radiator is arranged to have a hot fluid pass through it under the control of a flow-rate regulation valve.

16. A device according to claim 1, wherein the casing delimits an air heating branch in which the radiator is housed and a cold air transmission branch, and wherein a mixing shutter is provided at the junction of the air heating and cold air transmission branches to distribute the first air flow between the two branches and to regulate the temperature of the air flow sent to the deicing and ventilation outlets.

17. A device according to claim 1, further comprising an upper air passage provided in the casing close to the first part of the radiator and communicating with an outlet chamber downstream of the radiator, this upper air passage being controlled by a shutter so that a proportion of the first air flow passes through this upper air passage without passing through the radiator.

18. Device according to claim 1, further comprising a lower air passage provided in the casing close to the second part of the radiator and close to the feet-level outlet and communicating with an outlet chamber downstream of the radiator, this lower air passage being controlled by at least one shutter so that a proportion of the second air flow passes through this lower air passage without passing through the radiator.

19. A device according to claim 1, wherein there is only one radiator.

20. A device according to claim 1, wherein the radiator is formed by joining two adjacent radiators to have respectively the first air flow and the second air flow pass therethrough.

21. A device according to claim 1, further comprising an additional radiator situated opposite the second part of the radiator and also operable to have the second air flow pass therethrough.

* * * * *